United States Patent
Shirai et al.

(10) Patent No.: US 8,722,297 B2
(45) Date of Patent: May 13, 2014

(54) RESIN BINDERS FOR TONERS

(75) Inventors: Eiji Shirai, Wakayama (JP); Hiroki Kakiuchi, Wakayama (JP)

(73) Assignee: Kao Corporation, Tokyo (JP)

( * ) Notice: Subject to any disclaimer, the term of this patent is extended or adjusted under 35 U.S.C. 154(b) by 199 days.

(21) Appl. No.: 13/043,104

(22) Filed: Mar. 8, 2011

(65) Prior Publication Data
US 2011/0217646 A1 Sep. 8, 2011

(30) Foreign Application Priority Data
Mar. 8, 2010 (JP) ................................. 2010-051125

(51) Int. Cl.
*G03G 9/087* (2006.01)

(52) U.S. Cl.
USPC .................. 430/109.4; 430/109.1; 430/109.2; 430/137.14

(58) Field of Classification Search
USPC ............ 430/109.1–109.4, 108.2, 105, 137.14
See application file for complete search history.

(56) References Cited

U.S. PATENT DOCUMENTS

| | | | |
|---|---|---|---|
| 2007/0141499 A1* | 6/2007 | Yamazaki et al. | 430/109.3 |
| 2009/0011347 A1 | 1/2009 | Daimon et al. | |
| 2010/0183965 A1* | 7/2010 | Yamanaka et al. | 430/107.1 |

OTHER PUBLICATIONS http://www.chemguide.co.uk/organicprops/alcohols/esterification.html, United Kingdom, Jim Clark, 2003.*
Chinese Office Action, dated Dec. 26, 2013, for Chinese Application No. 201110056009.0.

* cited by examiner

*Primary Examiner* — Mark F Huff
*Assistant Examiner* — Rashid Alam
(74) *Attorney, Agent, or Firm* — Birch, Stewart, Kolasch & Birch, LLP

(57) ABSTRACT

The present invention relates to a resin binder for toners which contains a crystalline polyester which is produced by polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol %, wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.

5 Claims, 1 Drawing Sheet

RESIN BINDERS FOR TONERS

FIELD OF THE INVENTION

The present invention relates to a resin binder for toners which contains a crystalline polyester and a process for producing thereof, and a toner for electrophotography and a process for producing thereof.

BACKGROUND OF THE INVENTION

Crystalline polyesters have been recently noticed as a resin binder suitable for improving a low-temperature fusing property of toners because they have a high compatibility with non-crystalline polyesters and are readily dispersed therein unlike other crystalline resins such as polyethylene, and exhibit a clear melting point owing to their crystalline moieties.

JP-A-2004-191927 ("JP-A" means unexamined published Japanese patent publication) discloses a toner for developing an electrostatic image which contains at least a crystalline polyester and an amorphous polymer as a resin binder and whose surface is coated with a surface layer containing the amorphous polymer as a main component, in which a content of the crystalline polyester is in the range of from 30 to 80% by weight, a proportion of the crystalline polyester contained in an outermost surface of the toner for developing an electrostatic image is 15 atomic % or less, and an average thickness of the surface layer is not less than 0.01 μm and not more than 0.5 μm, for the purpose of providing a toner for developing an electrostatic image which can be fused at a low temperature and has a sufficient charging property.

JP-A-2008-158197 discloses a process for producing a toner for developing an electrostatic image which includes at least an aggregating step of mixing a dispersion of non-crystalline polyester resin particles, a dispersion of crystalline polyester resin particles, a dispersion of colorant particles and a dispersion of releasing agent particles to form aggregated particles containing the non-crystalline polyester resin particles, the crystalline polyester resin particles, the colorant particles and the releasing agent particles; and a fusing and coalescing step of heating the aggregated particles to a temperature not lower than a glass transition temperature of the non-crystalline polyester resin to fuse and coalesce the aggregated particles, in which a mixture of the non-crystalline polyester resin and the crystalline polyester resin satisfies a specific molecular weight, for the purpose of providing a toner for developing an electrostatic image which is capable of forming a stable image for a long period of time.

The resin binder for toners which contains a crystalline polyester obtained using a carboxylic acid component containing an aliphatic dicarboxylic acid compound having 8 to 12 carbon atoms as a main component is excellent in low-temperature fusing property, but tends to be deteriorated in pressure storage stability and environmental stability.

JP-A-2004-191927 and JP-A-2008-158197 both disclose a so-called chemical toner or method using an aqueous dispersion of a crystalline polyester, but fail to specify the above problems and provide a means for solving the problems.

SUMMARY OF THE INVENTION

The present invention relates to a resin binder for toners which contains a crystalline polyester for toners which is used for producing a toner for electrophotography which is excellent in pressure storage stability and environmental stability while maintaining an excellent low-temperature fusing property. In addition, the present invention relates to a toner for electrophotography having these properties and a process for producing the resin binder for toners, and a toner for electrophotography and a process for producing the toner.

The present invention relates to the following aspects [1] to [5].

[1] A resin binder for toners which contains a crystalline polyester for toners which is produced by polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol %, wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.

[2] A toner for electrophotography which contains the resin binder for toners as described in the above aspect [1].

[3] A process for producing a resin binder for toners which contains a crystalline polyester for toners, including the step of polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol % to obtain the crystalline polyester, wherein a molar ratio of the carboxylic acid component to the alcohol component (carboxylic acid component/alcohol component) is from 1.03 to 1.20, and the process includes the step of conducting the polycondensation in a temperature range of from 130 to 160° C. until a reaction rate as calculated from an amount of a reaction water discharged from the reaction system reaches 40% or more assuming that the reaction rate upon discharge of a theoretical amount of the reaction water is 100%.

[4] A process for producing a toner, including the following steps 1 to 4:

Step 1: polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol % to obtain a crystalline polyester, wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.;

Step 2: preparing an aqueous dispersion containing the crystalline polyester obtained in the step 1;

Step 3: mixing the aqueous dispersion containing the crystalline polyester which is prepared in the step 2 with an aqueous dispersion containing a non-crystalline resin and then subjecting the resulting dispersion to an aggregating step to prepare an aqueous dispersion of aggregated particles; and Step 4: subjecting the aqueous dispersion of the aggregated particles prepared in the step 3 to a coalescing step to prepare an aqueous dispersion of coalesced particles.

[5] A toner for electrophotography which is produced by the process as described in the above aspect [4].

The "methyl ethyl ketone soluble component (at 20° C.) of the crystalline polyester" as used in the present invention means a component contained in the crystalline polyester which can be dissolved in methyl ethyl ketone at 20° C. under the conditions described in the below-mentioned Examples. In the present specification, methyl ethyl ketone may also be occasionally referred to merely as "MEK".

DETAILED DESCRIPTION OF THE INVENTION

Figure 1:
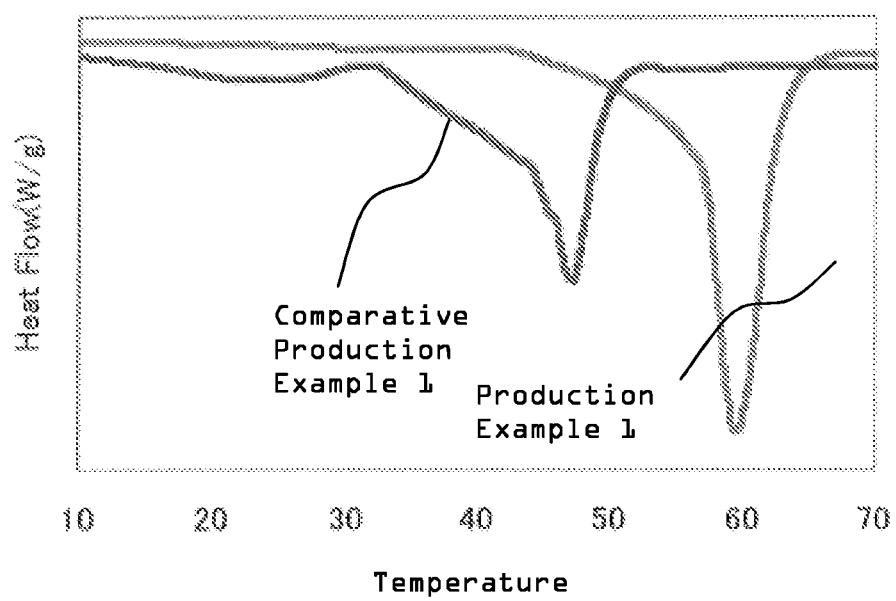
FIG. 1 is graph showing endothermic peaks of MEK soluble components of the crystalline polyesters obtained in Production Example 1 and Comparative Production Example 1 as measured by a differential scanning calorimeter.

The present inventors have suggested that the above problems are caused by a low-molecular weight component having a low melting point (for example, a low-molecular weight component having a weight-average molecular weight of 500 or less; hereinafter defined in the same way) which is deposited on a surface of the respective toner particles when the low-molecular weight component to be dissolved in a solvent remains non-emulsified or undissolved in in the solvent or water and is then subjected to removal of the solvent and drying, and the like.

The present inventors have unexpectedly found that even the low-molecular weight component to be dissolved in a solvent has substantially no adverse influence on a pressure storage stability and an environmental stability of a resin binder for toners as long as the low-molecular weight component has a melting point slightly lower than that of the crystalline polyester, so that the resulting toner can be improved in low-temperature fusing property thereof. The reason therefor is considered to be that the low-molecular weight component deposited on a surface of the toner is fused earlier than the crystalline polyester, thereby inducing fusion of the crystalline polyester in the toner. Further, the present inventors have found that the low-molecular weight component contains a low-molecular polyester having a carboxyl end group as a main component.

[Resin Binder for Toners]

The resin binder for toners according to the present invention (hereinafter occasionally referred to merely as a "resin binder") is a resin binder for toners which contains a crystalline polyester for toners which is produced by polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol %, wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.

In the followings, the crystalline polyester is explained.

The crystallinity of a resin such as polyesters as used herein is expressed by a crystallinity index defined by a ratio of a softening point to an endothermic maximum peak temperature as measured by a differential scanning colorimeter (DSC), i.e., "softening point/endothermic maximum peak temperature". In general, when the crystallinity index value exceeds 1.4, the resin becomes non-crystalline, whereas when the crystallinity index value is less than 0.6, the resin exhibits a low crystallinity and contains a large amount of a non-crystalline portion. In the present invention, the "crystalline polyester" means a polyester in which the crystallinity index value is in the range of from 0.6 to 1.4, preferably from 0.8 to 1.2 and more preferably from 0.9 to 1.1, whereas the "non-crystalline resin" means a resin in which the crystallinity index value is more than 1.4 or less than 0.6.

The "endothermic maximum peak temperature" means a temperature of such a peak as located on a highest temperature side among endothermic peaks observed under the conditions of the measuring methods as described in the below-mentioned Examples. When a difference between the maximum peak temperature and the softening point is within 20° C., the maximum peak temperature is regarded as a melting point of the crystalline resin (crystalline polyester), whereas the peak observed when the difference between the maximum peak temperature and the softening point exceeds 20° C. is regarded as a peak attributed to glass transition of the non-crystalline resin.

The crystallinity of the resin may be controlled according to the kinds and proportions of raw monomers used, production conditions (such as, e.g., reaction temperature, reaction time and cooling rate) and the like.

<Alcohol Component>

The alcohol component as a raw monomer of the crystalline polyester contains an aliphatic diol having 2 to 12 carbon atoms from the viewpoint of enhancing a crystallinity of the polyester.

Examples of the aliphatic diol having 2 to 12 carbon atoms include ethylene glycol, 1,2-propylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, neopentyl glycol and 1,4-butenediol. Among these aliphatic diols, from the viewpoints of a good low-temperature fusing property, a good pressure storage stability and a good environmental stability of the resulting toner (hereinafter occasionally referred to merely as "a low-temperature fusing property, a pressure storage stability and an environmental stability"), preferred are aliphatic diols having 5 to 9 carbon atoms, and more preferred are aliphatic diols having 5 to 6 carbon atoms. Also, from the viewpoint of a high crystallinity, preferred are $\alpha,\omega$-linear alkanediols having 2 to 12 carbon atoms, more preferred are $\alpha,\omega$-linear alkanediols having 5 to 9 carbon atoms, and still more preferred is 1,6-hexanediol.

The content of the aliphatic diol having 2 to 12, preferably 5 to 9, more preferably 5 to 6 carbon atoms in the alcohol component is preferably 70 mol % or larger, more preferably from 80 to 100 mol % and still more preferably from 90 to 100 mol % from the viewpoint of enhancing a crystallinity of the crystalline polyester. The content of the $\alpha,\omega$-linear alkanediol having 2 to 12, preferably 5 to 9, more preferably 5 to 6 carbon atoms as aliphatic diol in the alcohol component is preferably 70 mol % or larger, more preferably from 70 to 100 mol % and still more preferably from 90 to 100 mol %. The $\alpha,\omega$-linear alkanediol is preferably one kind of alcohol from the viewpoint of enhancing a crystallinity of the crystalline polyester.

Examples of polyhydric alcohols other than the aliphatic diol having 2 to 12 carbon atoms which may be contained in the alcohol component include aromatic diols such as an alkyleneoxide adduct of bisphenol A represented by the following formula (I):

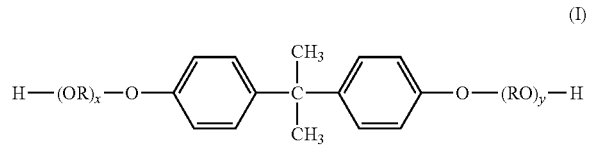

(I)

wherein R is an alkylene group having 2 or 3 carbon atoms; and x and y are respectively a positive number with the proviso that a sum of x and y is from 1 to 16 and preferably from 1.5 to 5,
including a polyoxypropylene adduct of 2,2-bis(4-hydroxyphenyl)propane and a polyoxyethylene adduct of 2,2-bis(4-hydroxyphenyl)propane; and trivalent or higher-valent alcohols such as glycerol, pentaerythritol and trimethylol propane.

<Carboxylic Acid Component>

The carboxylic acid component as a raw monomer of the crystalline polyester contains at least an aliphatic dicarboxylic acid compound having 8 to 12 carbon atoms from the viewpoints of a low-temperature fusing property, a pressure storage stability and an environmental stability of the resulting toner.

In the present invention, carboxylic acids as well as derivatives of the carboxylic acids such as anhydrides and alkyl ($C_1$ to $C_3$) esters thereof are generally referred to as the "carboxylic acid compound". Meanwhile, the number of carbon atoms contained in the alkyl group of the alkyl ester is not included in the number of carbon atoms in the carboxylic acid compound.

Examples of the aliphatic dicarboxylic acid compound having 8 to 12 carbon atoms include suberic acid, azelaic acid, sebacic acid and 1,10-decanedicarboxylic acid. Among these acids, from the viewpoints of a low-temperature fusing property, a pressure storage stability and an environmental stability of the resulting toner, preferred are aliphatic dicarboxylic acid compounds having 10 to 12 carbon atoms, and more preferred is sebacic acid.

The content of the aliphatic dicarboxylic acid compound having 8 to 12 carbon atoms in the carboxylic acid component is from 70 to 100 mol %, preferably from 90 to 100 mol %, and more preferably substantially 100 mol %. When the content of the aliphatic dicarboxylic acid compound having 8 to 12 carbon atoms in the carboxylic acid component is less than 70 mol %, the resulting toner tends to be deteriorated in low-temperature fusing property.

In the present invention, the carboxylic acid component other than the aliphatic dicarboxylic acid compound having 8 to 12 carbon atoms may be used in combination therewith. Examples of the other carboxylic acid component include aromatic dicarboxylic acid compounds, aliphatic dicarboxylic acid compounds having 2 to 7 carbon atoms and trivalent or higher-valent aromatic polycarboxylic acid compounds, although not particularly limited thereto.

The aromatic dicarboxylic acid compound used in the present invention includes aromatic dicarboxylic acid derivatives capable of forming the same constitutional unit as that derived from the aromatic dicarboxylic acid by condensation reaction. Specific examples of the aromatic dicarboxylic acid compound include aromatic dicarboxylic acids such as phthalic acid, isophthalic acid and terephthalic acid, and anhydrides and alkyl ($C_1$ to $C_3$) esters of these acids. Examples of the alkyl group of the alkyl esters include methyl, ethyl, propyl and isopropyl.

Examples of the aliphatic dicarboxylic acid compounds having 2 to 7 carbon atoms include oxalic acid, malonic acid, maleic acid, fumaric acid, citraconic acid, itaconic acid, glutaconic acid, succinic acid and adipic acid; succinic acid derivatives such as dodecylsuccinic acid, dodecenylsuccinic acid and octenylsuccinic acid; and anhydrides and alkyl ($C_1$ to $C_3$) esters of these acids.

Examples of the trivalent or higher-valent polycarboxylic acid compounds include aromatic carboxylic acids such as 1,2,4-benzenetricarboxylic acid (trimellitic acid), 2,5,7-naphthalenetricarobxylic acid and pyromellitic acid; and derivatives of these acids such as anhydrides and alkyl ($C_1$ to $C_3$) esters of these acids.

<Molar Ratio between Alcohol Component and Carboxylic Acid Component>

The molar ratio of the carboxylic acid component to the alcohol component (carboxylic acid component/alcohol component) as the raw monomers used in the polycondensation reaction is preferably from 1.03 to 1.20, more preferably from 1.03 to 1.15, still more preferably from 1.04 to 1.12 and further still more preferably from 1.05 to 1.10 in order to allow the below-mentioned MEK (methyl ethyl ketone) soluble component to include a carboxyl group as a main end group thereof and enhance a low-temperature fusing property, a pressure storage stability and an environmental stability of the resulting toner. When the molar ratio (carboxylic acid component/alcohol component) is 1.03 or more, the content of a hydroxyl end group in the MEK soluble component is reduced, so that an endothermic peak top temperature observed in DSC measurement of the MEK soluble component (at 20° C.) is raised, and the resulting toner is enhanced in low-temperature fusing property, pressure storage stability and environmental stability. When the molar ratio (carboxylic acid component/alcohol component) is 1.20 or less, the amount of the MEK soluble component is prevented from excessively increasing, so that the resulting toner can be enhanced in pressure storage stability and environmental stability.

<Composite Resin>

The crystalline polyester used in the present invention may be used in the form of a composite resin prepared by subjecting the raw monomers of the polyester together with (i) a raw monomer of a styrene-based resin and (ii) a double reactive monomer capable of reacting with both of the raw monomer of the styrene-based resin and the alcohol component to not only the polycondensation reaction but also addition polymerization reaction.

As the raw monomer of the styrene-based resin component, there may be used styrene and a styrene derivative such as α-methyl styrene and vinyl toluene (styrene and the styrene derivative are hereinafter collectively referred to as a "styrene derivative").

Examples of the double reactive monomer capable of reacting with both of the raw monomer of the styrene-based resin and the alcohol component include compounds containing at least one functional group selected from the group consisting of a hydroxyl group, a carboxyl group, an epoxy group, a primary amino group and a secondary amino group in a molecule thereof. Among these compounds, preferred are compounds containing a hydroxyl group and/or a carboxyl group, and more preferred are compounds having a carboxyl group and an ethylenically unsaturated bond. By using such a double reactive monomer, it is possible to further enhance a dispersibility of the resin as a dispersed phase.

The double reactive monomer is preferably at least one compound selected from the group consisting of acrylic acid, methacrylic acid, fumaric acid, maleic acid and maleic anhydride. Among these monomers, from the viewpoint of a high reaction efficiency of the polycondensation reaction and addition polymerization reaction, preferred are acrylic acid, methacrylic acid and fumaric acid.

<Properties of Crystalline Polyester>

The properties of the crystalline polyester used in the present invention are as follows.

From the viewpoints of a low-temperature fusing property, a pressure storage stability and an environmental stability of the resulting toner, the crystalline polyester used in the present invention preferably has a softening point of from 60 to 160° C., more preferably from 60 to 120° C., still more preferably from 65 to 100° C. and further still more preferably from 65 to 90° C.

The melting point of the crystalline polyester used in the present invention is preferably from 60 to 130° C., more preferably from 65 to 110° C. and still more preferably from 65 to 90° C. from the viewpoints of a low-temperature fusing property, a pressure storage stability and an environmental stability of the resulting toner.

From the viewpoints of a low-temperature fusing property and a pressure storage stability of the resulting toner, the number-average molecular weight of the crystalline polyester used in the present invention is generally preferably 1,000 or more, and more preferably 1,500 or more. However, in view of a high productivity of the crystalline polyester, the number-average molecular weight thereof is preferably 6,000 or less, more preferably 5,000 or less and still more preferably 4,500 or less. From the above viewpoints, the number-average molecular weight of the crystalline polyester used in the present invention is preferably from 1,000 to 6,000, more preferably from 1,000 to 5,000 and still more preferably from 1,500 to 4,500.

Also, from the same viewpoints as those for the number-average molecular weight, the weight-average molecular weight of the crystalline polyester of the present invention is preferably 3,000 or more, more preferably 5,000 or more, and still more preferably 8,000 or more, and is preferably 100,000 or less, more preferably 50,000 or less, still more preferably 30,000 or less and further still more preferably 20,000 or less. From the above viewpoints, the weight-average molecular weight of the crystalline polyester of the present invention is preferably from 3,000 to 100,000, more preferably from 5,000 to 50,000, still more preferably from 5,000 to 30,000 and further still more preferably from 8,000 to 20,000.

Meanwhile, in the present invention, each of the number-average molecular weight and the weight-average molecular weight of the crystalline polyester means the value as measured with respect to a chloroform soluble component in the crystalline polyester.

When the crystalline polyester is used in the form of the composite resin, the number-average molecular weight of the styrene-based resin component in the crystalline polyester is preferably from 400 to 7,000, more preferably from 1,000 to 4,000, and still more preferably from 1,500 to 3,000 from the viewpoint of a good dispersibility of the styrene-based resin in the crystalline resin in the form of a composite resin. In the present invention, the number-average molecular weight of the styrene-based resin means the value as measured with respect to a tetrahydrofuran (THF) soluble component therein.

The acid value of the crystalline polyester used in the present invention is preferably from 10 to 40 mg KOH/g, more preferably from 15 to 35 mg KOH/g and still more preferably from 20 to 30 mg KOH/g from the viewpoints of well controlling properties of the MEK soluble component and enhancing a low-temperature fusing property, a pressure storage stability and an environmental stability of the resulting toner.

The hydroxyl value of the crystalline polyester used in the present invention is preferably from 1 to 20 mg KOH/g, more preferably from 5 to 15 mg KOH/g and still more preferably from 7 to 13 mg KOH/g from the viewpoints of well controlling properties of the MEK soluble component and enhancing a low-temperature fusing property, a pressure storage stability and an environmental stability of the resulting toner.

The softening point, melting point, number-average molecular weight, weight-average molecular weight, acid value and hydroxyl value of the crystalline polyester may be readily adjusted by appropriately controlling a composition of the raw monomers, a polymerization initiator, a molecular weight, an amount of a catalyst used or the like, or selecting suitable reaction conditions.

<Properties of MEK Soluble Component of Crystalline Polyester>

The content of the MEK soluble component (at 20° C.) in the crystalline polyester used in the present invention is from 0.5 to 7% by weight, preferably from 0.5 to 6% by weight, more preferably from 1 to 5% by weight and still more preferably from 1 to 4% by weight on the basis of a weight of the crystalline polyester. When the content of the MEK soluble component is less than 0.5% by weight, the resulting toner tends to be deteriorated in low-temperature fusing property. Whereas, when the content of the MEK soluble component is more than 7% by weight, the resulting toner tends to be deteriorated in pressure storage stability and environmental stability owing to increase in amount of a soluble component due to a hydroxyl end group therein. The content of the MEK soluble component (at 20° C.) in the crystalline polyester can be reduced as described hereinafter by (a) a method in which the polycondensation reaction for the crystalline polyester is carried out during a temperature rise step (from 130 to 160° C.) in the reaction until a reaction rate of the polycondensation reaction reaches a predetermined value, (b) a method in which an esterification catalyst is added to the reaction system in a late stage of the polycondensation reaction in which a reaction rate of the polycondensation reaction is 70% or more, (c) a method in which the polycondensation reaction is carried out under reduced pressure when a reaction rate of the polycondensation reaction reaches 90% or more, (d) a method in which the above molar ratio of the carboxylic acid component to the alcohol component (carboxylic acid component/alcohol component) is adjusted to the range of from 1.03 to 1.20, or the like.

The difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C., preferably from 1.5 to 12° C., more preferably from 3 to 11° C. and still more preferably from 3 to 9° C. from the viewpoints of a low-temperature fusing property, a pressure storage stability and an environmental stability of the resulting toner. When the temperature difference of ["melting point of the crystalline polyester"–"peak top temperature observed in DSC measurement of the methyl ethyl ketone soluble component"] is more than 15° C., the resulting toner tends to be deteriorated in not only low-temperature fusing property owing to the effect induced by the temperature difference, but also pressure storage stability and environmental stability. On the other hand, when the temperature difference of ["melting point of the crystalline polyester"–"peak top temperature observed in DSC measurement of the methyl ethyl ketone soluble component"] is less than 1° C., the effect of improving a low-temperature fusing property of the resulting toner owing to the effect induced by the temperature difference tends to be lowered. The temperature difference of ["melting point of the crystalline polyester"–"peak top temperature observed in DSC measurement of the methyl ethyl ketone soluble component"] can be suitably adjusted by raising the peak top temperature of the MEK soluble component.

The peak top temperature observed in DSC measurement of the MEK soluble component (at 20° C.) is preferably 50° C. or higher, more preferably 53° C. or higher and still more preferably 55° C. or higher. When the peak top temperature is lower than 50° C., the resulting toner tends to be deteriorated in pressure storage stability and environmental stability. The endothermic peak top temperature is preferably 90° C. or lower, and more preferably 80° C. or lower from the viewpoint of a good low-temperature fusing property of the resulting toner. From these viewpoints, the endothermic peak top temperature of the MEK soluble component (at 20° C.) is preferably from 50 to 90° C., more preferably from 53 to 80° C. and still more preferably from 55 to 80° C.

The endothermic peak top temperature of the MEK soluble component (at 20° C.) may be raised by the above methods (a) to (d) and the like.

Further, it is preferred that any endothermic peak (preferably an endothermic peak having an endotherm of 1 J/g or higher) be not observed in the temperature range of from 10 to 40° C. of the MEK soluble component (at 20° C.) under the below-mentioned measuring conditions, from the viewpoints of a pressure storage stability and an environmental stability of the resulting toner. By adopting the above methods (a) to (d) and the like, the endothermic peak can be prevented from being observed in the temperature range of from 10 to 40° C.

In order to satisfy such a condition that the melting point of the MEK soluble component is slightly lower than the melting point of the crystalline polyester, it is preferred that the MEK soluble component contain a carboxyl group as an end group thereof. Therefore, from the viewpoint of a good low-temperature fusing property of the resulting toner, the acid value of the MEK soluble component (at 20° C.) is preferably from 40 to 100 mg KOH/g, more preferably from 50 to 90 mg KOH/g and still more preferably from 60 to 80 mg KOH/g.

Also, from the viewpoints of a good pressure storage stability and a good environmental stability of the resulting toner, the hydroxyl value of the MEK soluble component (at 20° C.) is preferably 40 mg KOH/g or less, more preferably 35 mg KOH/g or less and still more preferably 30 mg KOH/g or less, and the lower limit of the hydroxyl value of the MEK soluble component is preferably 1 mg KOH/g or more, and more preferably 5 mg KOH/g or more. From these viewpoints, the hydroxyl value of the MEK soluble component is preferably from 1 to 40 mg KOH/g, more preferably from 5 to 35 mg KOH/g and still more preferably from 5 to 30 mg KOH/g. When the MEK soluble component contains many hydroxyl end groups, an endothermic peak (having an endotherm of 1 J/g or more) is observed in the temperature range of from 10 to 40° C. of the MEK soluble component (at 20° C.), so that the resulting toner tends to be deteriorated in pressure storage stability and environmental stability.

<Process for Producing Crystalline Polyester>

The process for producing the crystalline polyester used in the present invention includes the step of polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol %. The molar ratio of the carboxylic acid component to the alcohol component (carboxylic acid component/alcohol component) which are used as the raw monomers in the polycondensation reaction is from 1.03 to 1.20. The above production process preferably includes the step of conducting the polycondensation reaction in a temperature range of from 130 to 160° C. until a reaction rate as calculated from an amount of a reaction water discharged from the reaction system reaches 40% or more assuming that the reaction rate upon discharge of a theoretical amount of the reaction water is 100%.

The kinds of alcohol component and carboxylic acid component and the molar ratio therebetween (carboxylic acid component/alcohol component) are the same as those described above.

The polycondensation reaction between the alcohol component and the carboxylic acid component may be carried out, for example, in the presence of the below-mentioned esterification catalyst such as a tin compound and a titanium compound in an inert gas atmosphere. The temperature used in the polycondensation reaction is preferably from 130 to 250° C., and the final temperature to be reached after the temperature rise step is preferably from 180 to 250° C. and more preferably from 190 to 230° C.

In addition, the polycondensation reaction is suitably carried out in a temperature range of from 130 to 160° C. and preferably from 130 to 150° C. during the temperature rise step until the reaction rate as calculated from an amount of the reaction water discharged from the reaction system reaches preferably 40% or more, more preferably 50% or more and still more preferably 60% or more assuming that the reaction rate upon discharge of a theoretical amount of the reaction water is 100%.

In view of a high productivity of the crystalline polyester by conducting the polycondensation reaction in the relatively low temperature range of from 130 to 160° C., the reaction rate is preferably 80% or less. Therefore, the polycondensation reaction is carried out in the above temperature range until the reaction rate reaches preferably from 40 to 80%, more preferably from 50 to 80% and still more preferably from 60 to 80%.

Thus, when the polycondensation reaction of a mixture of the alcohol component and the carboxylic acid component proceeds in the relatively low temperature range of from 130 to 160° C. during the temperature rise step until the reaction rate reaches 40% or more, it is possible to reduce an amount of the MEK soluble component and increase an endothermic peak top temperature of the MEK soluble component. The reason therefor is considered to be that the monomer components can be reacted with each other to a sufficient extent under the above conditions, so that low-molecular weight components contained therein can be reduced as compared to the case where the reaction is carried out at a high temperature for a short period of time.

The polycondensation reaction tends to hardly proceed at a temperature lower than 130° C. Whereas, when the temperature exceeds 160° C., the amount of the MEK soluble component tends to be increased, or the endothermic peak top temperature of the MEK soluble component tends to be lowered. When the reaction rate to be reached is less than 40%, a large amount of the monomers tend to remain unreacted. If the temperature is raised higher than 160° C. under such a condition that a large amount of the unreacted monomers are still present, the amount of the MEK soluble component tends to be increased, or the endothermic peak top temperature of the MEK soluble component tends to be lowered.

It is not necessarily required that the temperature is continuously held in the range of from 130 to 160° C. until the reaction rate of the polycondensation reaches 40% or more, and the temperature may be temporarily out of the above temperature range unless the aimed effects of the present invention are adversely affected. That is, it may be sufficient that the temperature lies within the range of from 130 to 160° C. at any time at which the reaction rate is finally 40% or more.

More specifically, by conducting the reaction for a period of preferably from 3 to 12 hours, more preferably from 3 to 10 hours and still more preferably from 3 to 8 hours while maintaining the above temperature range, it is possible to increase the reaction rate up to 40% or more.

The polycondensation reaction is preferably carried out in the presence of an esterification catalyst. From the viewpoint of obtaining a crystalline polyester having a high storage elastic modulus, the polycondensation reaction is preferably carried out in the presence of both the esterification catalyst and a pyrogallol compound.

Examples of the esterification catalyst suitably used in the polycondensation reaction include titanium compounds and tin (II) compounds containing no Sn—C bond. These titanium and tin compounds as the esterification catalyst may be respectively used alone or in combination of any two or more thereof.

The titanium compound is preferably a titanium compound having a Ti—O bond and more preferably a titanium compound containing an alkoxy group, an alkenyloxy group or an acyloxy group having 1 to 28 carbon atoms in total.

Specific examples of the titanium compound include titanium diisopropylate bis(triethanolaminate) [$Ti(C_6H_{14}O_3N)_2(C_3H_7O)_2$], titanium diisopropylate bis(diethanolaminate) [$Ti(C_6H_{10}O_2N)_2(C_3H_7O)_2$], titanium dipentylate bis(triethanolaminate) [$Ti(C_6H_{14}O_3N)_2(C_5H_{11}O)_2$], titanium diethylate bis(triethanolaminate) [$Ti(C_6H_{14}O_3N)_2(C_2H_5O)_2$], titanium dihydroxyoctylate bis(triethanolaminate) [$Ti(C_6H_{14}O_3N)_2(OHC_8H_{16}O)_2$], titanium distearate bis(triethanolaminate) [$Ti(C_6H_{14}O_3N)_2(C_{18}H_{37}O)_2$], titanium triisopropylate triethanolaminate [$Ti(C_6H_{14}O_3N)_1(C_3H_7O)_3$] and titanium monopropylate tris(triethanolaminate) [$Ti(C_6H_{14}O_3N)_3(C_3H_7O)_1$]. Among these titanium compounds, preferred are titanium diisopropylate bis(triethanolaminate), titanium diisopropylate bis(diethanolaminate) and titanium dipentylate bis(triethanolaminate). These titanium compounds are also available, for example, as commercial products marketed from Matsumoto Trading Co., Ltd.

Specific examples of the other suitable titanium compounds include tetra-n-butyl titanate [$Ti(C_4H_9O)_4$], tetrapropyl titanate [$Ti(C_3H_7O)_4$], tetrastearyl titanate [$Ti(C_{18}H_{37}O)_4$], tetramyristyl titanate [$Ti(C_{14}H_{29}O)_4$], tetraoctyl titanate [$Ti(C_8H_{17}O)_4$], dioctyldihydroxyoctyl titanate [$Ti(C_8H_{17}O)_2(OHC_8H_{16}O)_2$] and dimyristyl dioctyl titanate [$Ti(C_{14}H_{29}O)_2(C_8H_{17}O)_2$]. Among these other suitable titanium compounds, preferred are tetrastearyl titanate, tetramyristyl titanate, tetraoctyl titanate and dioctyldihydroxyoctyl titanate. These titanium compounds may be produced, for example, by reacting a titanium halide with a corresponding alcohol, and are also available as commercial products marketed from Nisso Co., Ltd.

Examples of the preferred tin (II) compound containing no Sn—C bond include tin (II) compounds having a Sn—O bond and tin (II) compounds having a Sn—X bond wherein X represents a halogen atom. Among these tin compounds, preferred are tin (II) compounds having a Sn—O bond.

Examples of the tin (II) compound having a Sn—O bond include tin (II) carboxylates containing a carboxyl group having 2 to 28 carbon atoms such as tin (II) oxalate, tin (II) diacetate, tin (II) dioctanoate, tin (II) dilaurate, tin (II) distearate and tin (II) dioleate; dialkoxy tin (II) containing an alkoxy group having 2 to 28 carbon atoms such as dioctyloxy tin (II), dilauryloxy tin (II), distearoxy tin (II) and dioleyloxy tin (II); tin (II) oxide; and tin (II) sulfate.

Examples of the tin (II) compound having a Sn—X bond wherein X represents a halogen atom include tin (II) halides such as tin (II) chloride and tin (II) bromide. Among these tin (II) compounds, in view of a good charging raise-up effect and a good catalyst performance, preferred are fatty acid tin (II) salts represented by the formula: $(R^1COO)_2Sn$ (wherein $R^1$ is an alkyl or alkenyl group having 5 to 19 carbon atoms), dialkoxy tin (II) compounds represented by the formula: $(R^2O)_2Sn$ (wherein $R^2$ is an alkyl or alkenyl group having 6 to 20 carbon atoms), and tin (II) oxide represented by the formula: SnO, more preferred are fatty acid tin (II) salts represented by the formula: $(R^1COO)_2Sn$ and tin (II) oxide, and still more preferred are tin (II) dioctanoate, tin (II) distearate and tin (II) oxide.

The above titanium compounds and the tin (II) compounds may be respectively used alone or in combination of any two or more thereof.

The amount of the esterification catalyst being present in the reaction system is preferably from 0.01 to 1 part by weight and more preferably from 0.1 to 0.6 parts by weight on the basis of 100 parts by weight of a total amount of the alcohol component and the carboxylic acid component.

Also, the pyrogallol compound is a compound containing a benzene ring in which three hydrogen atoms adjacent to each other are respectively substituted with a hydroxyl group. Examples of the pyrogallol compound include pyrogallol, gallic acid, gallic acid esters, benzophenone derivatives such as 2,3,4-trihydroxybenzophenone and 2,2',3,4-tetrahydroxybenzophenone, and catechin derivatives such as epigallocatechin and epigallocatechin gallate.

The amount of the pyrogallol compound being present in the polycondensation reaction system is preferably from 0.001 to 1 part by weight, more preferably from 0.005 to 0.4 parts by weight and still more preferably from 0.01 to 0.2 parts by weight on the basis of 100 parts by weight of a total amount of the alcohol component and the carboxylic acid component which are subjected to the polycondensation reaction. The "amount of the pyrogallol compound being present" as used herein means a total amount of the pyrogallol compound blended which is subjected to the polycondensation reaction.

The weight ratio of the pyrogallol compound to the esterification catalyst (pyrogallol compound/esterification catalyst) is preferably from 0.01 to 0.5, more preferably from 0.03 to 0.3 and still more preferably from 0.05 to 0.2 from the viewpoint of a good durability of the resulting resin.

In addition, the catalyst is preferably added to the reaction system when a reaction rate of the polycondensation reaction (polycondensation reaction rate as calculated from an amount of a reaction water discharged from the reaction system assuming that the reaction rate upon discharge of a theoretical amount of the reaction water is 100%; hereinafter defined in the same way) reaches 70% or more from the viewpoint of reducing an amount of the MEK soluble component and increasing an endothermic peak top temperature of the MEK soluble component. The catalyst tends to be deactivated by the reaction water. The catalyst continuously used from an early stage of the reaction and finally deactivated tends to have adverse influences on an activity of a catalyst added at a later stage of the reaction, and tends to deteriorate a crystallinity of the obtained crystalline polyester. Therefore, the amount of the catalyst added at the early stage of the reaction is preferably lessened.

The amount of the catalyst added when the reaction rate of the polycondensation reaction reaches 70% or more and preferably from 70 to 90% is preferably 50% by weight or more, more preferably 70% by weight or more, and still more preferably 80% by weight or more on the basis of a whole amount of the catalyst added to the reaction system. When the amount of the catalyst added when the reaction rate reaches 70% or more is 50% by weight or more on the basis of a whole amount of the catalyst added to the reaction system, the amount of the MEK soluble component can be effectively reduced, so that the endothermic peak top temperature of the MEK soluble component can be raised. Further, after completion of adding the catalyst, the polycondensation reaction is preferably carried out under reduced pressure for 30 min or longer to reduce the amount of the MEK soluble component and raise the endothermic peak top temperature of the MEK soluble component.

In addition, when the reaction rate of the polycondensation reaction reaches 90% or more, the polycondensation reaction is preferably carried out under a reduced pressure of 12 kPa or less for a pressure-reduced period of 1 hour or longer, more preferably from 1 to 10 hours and still more preferably from 1 to 5 hours, from the viewpoints of reducing the amount of the MEK soluble component and raising the endothermic peak top temperature of the MEK soluble component (at 20° C.).

The terminal point of the polycondensation reaction is the time at which the crystalline polyester is withdrawn from a reaction vessel in the case where the reaction is terminated in the reaction vessel using no stirrer, or the time at which the stirring procedure is substantially stopped in the case where the reaction is terminated in the reaction vessel using a stirrer. Meanwhile, the terminal point of the polycondensation reaction may vary depending upon properties of the resin to be obtained, and is usually at the time at which the reaction rate of the polycondensation reaction reaches 90% or more. The stirring rate during the polycondensation reaction is preferably from about 50 to about 1,000 rpm and more preferably from about 100 to about 500 rpm.

The thus obtained crystalline polyester is useful as a crystalline polyester for toners, and is contained in the resin binder for toners according to the present invention.

Upon production of the resin binder for toners and the toner for electrophotography according to the present invention, from the viewpoints of a low-temperature fusing property, a pressure storage stability and an environmental stability of the resulting toner, the crystalline polyester is preferably used in combination with a non-crystalline resin.

<Non-Crystalline Resin>

The non-crystalline resin is preferably a polycondensation-based resin obtained by polycondensing an alcohol component with a carboxylic acid component. The non-crystalline resin used in the present invention is preferably a polyester resin obtained by polycondensing the alcohol component containing an alkyleneoxide adduct of bisphenol A represented by the above formula (I) and/or an aliphatic diol having 2 to 12 carbon atoms in an amount of 70 mol % or more with the carboxylic acid component.

(Alcohol Component)

As the alcohol component of the non-crystalline resin, there may be used the alkyleneoxide adduct of bisphenol A or the aliphatic diol having 2 to 12 carbon atoms. Examples of the aliphatic diol having 2 to 12 carbon atoms include those described for the above crystalline polyester. Among these aliphatic diols, preferred are aliphatic diols having 2 to 5 carbon atoms, and more preferred is 1,2-propanediol.

Among the above compounds, the alkyleneoxide adduct of bisphenol A is preferably used as the alcohol component from the viewpoint of improving an environmental stability of the toner.

The total content of the alkyleneoxide adduct of bisphenol A in the alcohol component is preferably 70 mol % or more, more preferably from 80 to 100 mol % and still more preferably from 90 to 100 mol %.

Examples of alcohols other than the alkyleneoxide adduct of bisphenol A and the aliphatic diol having 2 to 12 carbon atoms which may be contained in the alcohol component include the same trivalent or higher-valent alcohols as used for the above crystalline polyester.

(Carboxylic Acid Component)

The carboxylic acid component of the non-crystalline resin preferably contains an aromatic dicarboxylic acid compound, more preferably a terephthalic acid compound, from the viewpoint of enhancing a pressure storage stability of the resulting toner. Meanwhile, the non-crystalline resin obtained using the terephthalic acid compound as the carboxylic acid component and the non-crystalline resin obtained using no terephthalic acid compound may be separately prepared and used in combination with each other. Examples of the aromatic dicarboxylic acid compound include those described for the above crystalline polyester.

The content of the aromatic dicarboxylic acid compound in the carboxylic acid component is preferably from 30 to 95 mol %, more preferably from 40 to 90 mol % and still more preferably from 50 to 85 mol %.

Examples of the divalent carboxylic acids other than the aromatic dicarboxylic acid compounds which may be contained in the carboxylic acid component include aliphatic dicarboxylic acids having 2 to 10 carbon atoms (preferably 4 to 10 carbon atoms and more preferably 4 to 8 carbon atoms) such as oxalic acid, malonic acid, maleic acid, fumaric acid, citraconic acid, itaconic acid, glutaconic acid, succinic acid and adipic acid; succinic acids substituted with an alkyl group having 8 to 20 carbon atoms or an alkenyl group having 8 to 20 carbon atoms, such as dodecylsuccinic acid, dodecenylsuccinic acid and octenylsuccinic acid; and anhydrides and alkyl ($C_1$ to $C_3$) esters of these acids.

When the aliphatic dicarboxylic acid having 2 to 10 carbon atoms is contained in the carboxylic acid component, the content of the aliphatic dicarboxylic acid in the carboxylic acid component is preferably from 5 to 60 mol %, more preferably from 5 to 40 mol % and still more preferably from 5 to 30 mol %. When the succinic acid substituted with an alkyl group having 8 to 20 carbon atoms or an alkenyl group having 8 to 20 carbon atoms is contained in the carboxylic acid component, the content of the substituted succinic acid in the carboxylic acid component is preferably from 3 to 30 mol %, more preferably from 5 to 20 mol % and still more preferably from 5 to 15 mol %.

Examples of the trivalent or higher-valent polycarboxylic acid compound other than the aromatic dicarboxylic acid compound which may be contained in the carboxylic acid component include those used for the above crystalline polyester.

When the trivalent or higher-valent polycarboxylic acid compound is contained in the carboxylic acid component, the content of the trivalent or higher-valent polycarboxylic acid compound in the carboxylic acid component is preferably from 3 to 40 mol %, more preferably from 5 to 35 mol % and still more preferably from 5 to 30 mol %.

<Properties of Non-Crystalline Resin>

From the viewpoints of a low-temperature fusing property, a pressure storage stability and an environmental stability of the resulting toner, the softening point of the non-crystalline resin used in the present invention is preferably from 70 to 180° C. and more preferably from 90 to 150° C. When the non-crystalline resin used in the present invention is in the form of a mixed resin composed of a resin having a higher softening point (hereinafter referred to as a "higher-softening point resin") and a resin having a lower softening point (hereinafter referred to as a "lower-softening point resin"), the resulting toner becomes more excellent from the viewpoints of a low-temperature fusing property, a pressure storage stability and an environmental stability thereof. When the higher-softening point resin is used in combination with the lower-softening point resin, one or both of the higher-softening point resin and the lower-softening point resin may be respectively composed of two or more kinds of resins.

More specifically, the softening point of the higher-softening point resin is preferably from 110 to 150° C., whereas the softening point of the lower-softening point resin is preferably not lower than 90° C. but lower than 110° C., and further the softening points of the higher-softening point resin and the lower-softening point resin are preferably different by 10° C. or more, more preferably different by 15 to 40° C., from each other.

When using the higher-softening point resin in combination with the lower-softening point resin, the weight ratio of the higher-softening point resin to the lower-softening point resin (higher-softening point resin/lower-softening point resin) is preferably from 1/3 to 3/1, more preferably from 1/3 to 1/2 and still more preferably from 1/2 to 1/1.

The acid value of the non-crystalline resin is preferably from 1 to 40 mg KOH/g, more preferably from 2 to 35 mg KOH/g and still more preferably from 3 to 30 mg KOH/g from the viewpoint of improving a dispersibility of the non-crystalline resin in the aqueous dispersion.

From the viewpoints of a low-temperature fusing property, a pressure storage stability and an environmental stability of the resulting toner, the glass transition temperature (Tg) of the non-crystalline resin is preferably from 45 to 80° C. and more preferably from 55 to 75° C.

The number-average molecular weight of the non-crystalline resin is preferably from 1,000 to 6,000 and more preferably from 2,000 to 5,000. Also, the weight-average molecular weight of the non-crystalline resin is preferably 10,000 or more, and more preferably 30,000 or more, but is preferably 1,000,000 or less. Meanwhile, the number-average molecular weight and the weight-average molecular weight of the non-crystalline resin both are the values as measured with respect to a tetrahydrofuran-soluble component contained therein.

Meanwhile, the softening point, acid value, Tg, number-average molecular weight and weight-average molecular weight of the non-crystalline resin may be readily controlled by suitably adjusting a composition of the raw monomers used, a polymerization initiator, a molecular weight of the resin, an amount of a catalyst used or the like, or selecting suitable reaction conditions.

<Modified Non-Crystalline Resin>

The non-crystalline resin used in the present invention may also include a modified non-crystalline resin.

Examples of the modified non-crystalline resin include urethane-modified polyesters obtained by modifying the resin with a urethane bond, epoxy-modified polyesters obtained by modifying the polyester with an epoxy bond, and hybrid resins containing two or more kinds of resins including a polyester component.

The non-crystalline resin used in the present invention may be constituted of either one or both of the above polyester resin and the modified non-crystalline resin thereof. More specifically, the non-crystalline resin may be the polyester solely and/or a hybrid resin composed of the polyester and the styrene-based resin.

[Resin Binder for Toners]

The resin binder for toners according to the present invention contains preferably both the crystalline polyester of the present invention and the non-crystalline resin. In the resin binder for toners according to the present invention, the weight ratio of the crystalline polyester to the non-crystalline resin (crystalline polyester/non-crystalline resin) is preferably from 3/97 to 50/50, more preferably from 5/95 to 40/60, still more preferably from 5/95 to 30/70 and further still more preferably from 7/93 to 25/75 from the viewpoints of a low-temperature fusing property, a pressure storage stability and an environmental stability of the resulting toner.

The acid value of the resin binder is preferably from 1 to 40 mg KOH/g, more preferably from 2 to 35 mg KOH/g and still more preferably from 3 to 30 mg KOH/g from the viewpoints of a good charging property and a good hydrolysis resistance of the resulting toner.

The softening point of the resin binder is preferably from 80 to 160° C., more preferably from 80 to 150° C. and still more preferably from 90 to 140° C. from the viewpoints of a low-temperature fusing property, a pressure storage stability and an environmental stability of the resulting toner. Also, the glass transition temperature of the toner is preferably from 45 to 80° C. and more preferably from 50 to 70° C. from the same viewpoints as described above.

The resin binder for toners according to the present invention is preferably obtained by the below-mentioned production process.

[Toner for Electrophotography]

The toner for electrophotography according to the present invention (hereinafter occasionally referred to merely as a "toner") contains the above resin binder for toners, and may also contain known resin binders for toners other than the above resin binder unless the aimed effects of the present invention are adversely affected. Examples of the other known resin binders include those resins such as polyesters, styrene-based resins such as styrene-acrylic resins, epoxy resins, polycarbonates and polyurethanes.

In the toner for electrophotography according to the present invention, the content of the resin binder for toners according to the present invention is preferably 50% by weight or more, more preferably 70% by weight or more, still more preferably 80% by weight or more, further still more preferably 90% by weight or more, and especially preferably substantially 100% by weight on the basis of a total weight of the whole resin binders contained therein.

[Process for Producing Resin Binder for Toners and Toner]

The resin binder for toners and the toner for electrophotography according to the present invention are preferably produced by the process in which an aqueous dispersion containing the crystalline polyester and an aqueous dispersion containing the non-crystalline resin are subjected to aggregating and coalescing steps.

More specifically, the resin binder for toners and the toner for electrophotography according to the present invention can be produced by the process including the following steps 1 to 4:

Step 1: polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol % to obtain a crystalline polyester, wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.;

Step 2: preparing an aqueous dispersion containing the crystalline polyester obtained in the step 1;

Step 3: mixing the aqueous dispersion containing the crystalline polyester which is prepared in the step 2 with an aqueous dispersion containing a non-crystalline resin and then subjecting the resulting mixture to an aggregating step to prepare an aqueous dispersion of aggregated particles; and Step 4: subjecting the aqueous dispersion of the aggregated particles prepared in the step 3 to a coalescing step to prepare an aqueous dispersion of coalesced particles.

In the followings, the above steps 1 to 4 are explained in order.

[Step 1]

In the step 1, the crystalline polyester is produced. Details of the step 1 are as described above.

[Step 2]

In the step 2, the aqueous dispersion containing the crystalline polyester obtained in the step 1 is prepared.

Meanwhile, the term "aqueous" as used herein means that it may also contain a solvent such as an organic solvent, but preferably contains water in an amount of 50% by weight or more, more preferably 70% by weight or more, still more preferably 90% by weight more and further still more preferably 99% by weight or more. Also, such a material as hereinafter referred to merely as a "resin" means both of the crystalline polyester and the non-crystalline resin.

The aqueous dispersion containing the crystalline polyester may be obtained by mixing the crystalline polyester, an organic solvent and water, if required, as well as a neutralizing agent and a surfactant, with each other, stirring the resulting mixture, and then removing the organic solvent from the obtained dispersion by distillation and the like. Preferably, the crystalline polyester is first dissolved, if required, together with the surfactant, in the organic solvent, and then the resulting organic solvent solution is mixed with water and, if required, the neutralizing agent. The mixture of the respective components may be stirred using an ordinary mixing and stirring apparatus such as an anchor blade.

Examples of the organic solvent include alcohol solvents such as ethanol, isopropanol and isobutanol; ketone solvents such as acetone, 2-butanone, methyl ethyl ketone, methyl isobutyl ketone and diethyl ketone; ether solvents such as dibutyl ether, tetrahydrofuran and dioxane; and ethyl acetate. Among these organic solvents, preferred are ethyl acetate and 2-butanone from the viewpoint of a good dispersibility of the crystalline polyester therein.

Examples of the neutralizing agent include hydroxides of alkali metals such as lithium hydroxide, sodium hydroxide and potassium hydroxide; and organic bases such as ammonia, trimethyl amine, ethyl amine, diethyl amine, triethyl amine, triethanol amine and tributyl amine.

Examples of the surfactant include anionic surfactants such as sulfate-based surfactants, sulfonate-based surfactants, phosphate-based surfactants and soap-based surfactants (such as, e.g., alkyl ether carboxylic acid salts); cationic surfactants such as amine salt-type surfactants and quaternary ammonium salt-type surfactants; and the below-mentioned nonionic surfactants. The amount of the surfactant, if used, is preferably from 0.1 to 20 parts by weight and more preferably from 0.5 to 10 parts by weight on the basis of 100 parts by weight of the crystalline polyester or the non-crystalline resin.

The amount of the organic solvent used when mixed with the crystalline polyester is preferably from 100 to 1000 parts by weight on the basis of 100 parts by weight of the crystalline polyester or the non-crystalline resin. The amount of water used when mixed with the crystalline polyester is preferably from 100 to 1000 parts by weight on the basis of 100 parts by weight of the organic solvent.

The temperature used upon mixing (dissolving) the crystalline polyester in the organic solvent is preferably from 30 to 90° C. and more preferably from 40 to 80° C.

The solid content of the thus obtained aqueous dispersion containing the crystalline polyester may be controlled by adding an appropriate amount of water thereto, and is preferably controlled to the range of from 3 to 50% by weight, more preferably from 5 to 30% by weight and still more preferably from 7 to 15% by weight.

Further, the aqueous dispersion containing the resin may be prepared without using the organic solvent, for example, by mixing a nonionic surfactant therewith. This is because when the resin is mixed with the nonionic surfactant, a viscosity of the obtained mixture is decreased. The decreased viscosity of the mixture occurs due to decrease in an apparent softening point of the resin which is caused by compatibilization between the resin and the nonionic surfactant. By utilizing this phenomenon, the apparent softening point of the resin compatibilized with the nonionic surfactant can be decreased to a temperature not higher than a boiling point of water. As a result, even the resin having a melting point or softening point of 100° C. or higher by itself may be formed into a dispersion of the resin in water by dropping water thereto under normal pressures.

This method may be carried out in the presence of at least water and the nonionic surfactant and is therefore applicable to resins that are insoluble in an organic solvent. In addition, the method needs neither facilities for recovering the organic solvent and maintaining working environments nor special equipments that will be required upon employing mechanical means, resulting in such an advantage that the dispersion of resin particles can be produced in an economical manner Examples of the nonionic surfactant include polyoxyethylene alkyl aryl ethers such as polyoxyethylene nonyl phenyl ether; polyoxyethylene alkyl ethers such as polyoxyethylene oleyl ether and polyoxyethylene lauryl ether; polyoxyethylene sorbitan esters such as polyoxyethylene sorbitan monolaurate and polyoxyethylene sorbitan monostearate; polyoxyethylene fatty acid esters such as polyethylene glycol monolaurate, polyethylene glycol monostearate and polyethylene glycol monooleate; and oxyethylene/oxypropylene block copolymers. The nonionic surfactant may also be used in combination with an anionic surfactant or a cationic surfactant.

The nonionic surfactant is preferably selected from those having a good compatibility with the resin. In order to obtain a stable dispersion of the resin, the nonionic surfactant preferably has a HLB value of 12 to 18. More preferably, two or more kinds of nonionic surfactants which are different in HLB from each other are used depending upon the kind of resin used. For example, when using the resin having a high hydrophilicity, the use of at least one kind of nonionic surfactant having a HLB value of 12 to 18 may be sufficient to obtain a stable dispersion thereof. On the other hand, when using the resin having a high hydrophobicity, the nonionic surfactant having a low HLB value, for example, a HLB value of about 7 to about 10, is preferably used in combination with the nonionic surfactant having a high HLB value, for example, a HLB value of 14 to 20 so as to control a weighted mean HLB value of both the nonionic surfactants to 12 to 18. In this case, it is suggested that the nonionic surfactant having a HLB value of about 7 to about 10 serves mainly for allowing the resin to become compatibilizable therewith, whereas the nonionic surfactant having a higher HLB value serves for stabilizing the dispersion of the resin in water.

When the resin is formed into fine particles in water under normal pressures, the cloud point of the nonionic surfactant is preferably from 70 to 105° C. and more preferably from 80 to 105° C.

The amount of the nonionic surfactant used is preferably 5 parts by weight or more on the basis of 100 parts by weight of the crystalline polyester from the viewpoint of decreasing a melting point of the resin, and is preferably 80 parts by weight or less on the basis of 100 parts by weight of the crystalline polyester from the viewpoint of controlling an amount of the nonionic surfactant remaining in the toner. Therefore, in view of achieving both the requirements, the amount of the nonionic surfactant used is preferably in the range of from 5 to 80 parts by weight, more preferably from 10 to 70 parts by weight and still more preferably from 20 to 60 parts by weight on the basis of 100 parts by weight of the crystalline polyester.

The volume median particle size of the crystalline polyester particles contained in the aqueous dispersion containing the crystalline polyester is preferably from 50 to 1,000 nm, more preferably from 50 to 500 nm, still more preferably from 50 to 300 nm and further still more preferably from 80 to 200 nm from the viewpoint of uniformly aggregating the particles in the subsequent step 3. The volume median particle size of the respective particles may be measured by a laser diffraction type particle size measuring apparatus and the like (hereinafter measured in the same way).

The coefficient of variation of particle size distribution (CV value) of the crystalline polyester particles contained in the aqueous dispersion thereof is preferably 50% or less, more preferably 30% or less and still more preferably 25% or less from the viewpoints of a low-temperature fusing property, a pressure storage stability and an environmental stability of the resulting toner. The lower limit of the CV value of the crystalline polyester particles is preferably 5% from the viewpoint of facilitated production thereof.

[Step 3]

In the step 3, the aqueous dispersion containing the crystalline polyester which is prepared in the step 2 is mixed with the aqueous dispersion containing the non-crystalline resin, and then the resulting dispersion is subjected to an aggregating step to prepare an aqueous dispersion of aggregated particles.

The method of preparing the aqueous dispersion containing the non-crystalline resin is the same as the method of preparing the aqueous dispersion containing the crystalline polyester as described in the above step 2. The volume median particle size of the non-crystalline resin particles contained in the aqueous dispersion containing the non-crystalline resin is preferably from 50 to 1,000 nm, more preferably from 50 to 500 nm, still more preferably from 50 to 300 nm and further still more preferably from 80 to 200 nm from the viewpoint of uniformly aggregating the particles.

The coefficient of variation of particle size distribution (CV value) of the non-crystalline resin particles contained in the aqueous dispersion thereof is preferably 50% or less, more preferably 30% or less and still more preferably 25% or less from the viewpoints of a low-temperature fusing property, a pressure storage stability and an environmental stability of the resulting toner. The lower limit of the CV value of the non-crystalline resin particles is preferably 5% from the viewpoint of facilitated production thereof.

In the step 3, the aggregating step may also be carried out after further adding various additives such as, for example, a colorant, a charge controlling agent, a releasing agent, a conductivity modifier, an extender pigment, a reinforcing filler such as fibrous substances, an antioxidant and an anti-aging agent to the respective aqueous dispersions. These additives may also be used in the form of an aqueous dispersion.

The colorant is not particularly limited, and may be appropriately selected from known colorants according to the aimed applications or requirements. Specific examples of the colorant include various pigments such as carbon blacks, inorganic composite oxides, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, red iron oxide, Aniline Blue, ultramarine blue, Calco Oil Blue, Methylene Blue Chloride, Phthalocyanine Blue, Phthalocyanine Green and Malachite Green Oxalate; and various dyes such as acridine dyes, xanthene dyes, azo dyes, benzoquinone dyes, azine dyes, anthraquinone dyes, indigo dyes, thioindigo dyes, phthalocyanine dyes, Aniline Black dyes, polymethine dyes, triphenylmethane dyes, diphenylmethane dyes, thiazin dyes and thiazole dyes. These colorants may be used alone or in combination of any two or more thereof. The amount of the colorant added is preferably from 0.1 to 20 parts by weight and more preferably from 1 to 10 parts by weight on the basis of 100 parts by weight of a total amount of the crystalline polyester and the non-crystalline resin.

Examples of the charge controlling agent include chromium-based azo dyes, iron-based azo dyes, aluminum-based azo dyes and metal complexes of salicylic acid. These charge controlling agents may be used alone or in combination of any two or more thereof. The amount of the charge controlling agent added is preferably from 0.1 to 8 parts by weight and more preferably from 0.3 to 7 parts by weight on the basis of 100 parts by weight of a total amount of the crystalline polyester and the non-crystalline resin.

Examples of the releasing agent include fatty acid amides such as oleamide, erucamide, ricinolamide and stearamide; vegetable waxes such as carnauba wax, rice wax, candelilla wax, haze wax and jojoba oil; animal waxes such as beeswax; mineral and petroleum waxes such as montan wax, ozokerite, ceresin, microcrystalline wax and Fischer-Tropsch wax; polyolefin waxes; paraffin waxes; and silicones. These releasing agents may be used alone or in combination of any two or more thereof. The melting point of the releasing agent is preferably from 60 to 140° C. and more preferably from 60 to 100° C. from the viewpoints of a low-temperature fusing property, a pressure storage stability and an environmental stability of the resulting toner.

The amount of the releasing agent added is preferably from 0.5 to 10 parts by weight, more preferably from 1 to 8 parts by weight and still more preferably from 1 to 7 parts by weight on the basis of 100 parts by weight of a total amount of the crystalline polyester and the non-crystalline resin in view of a good dispersibility in the resin.

The preferred mixing weight ratio between the crystalline polyester and the non-crystalline resin is the same as that described as to the above resin binder for toners.

The solid content in the reaction system used in the aggregating step is preferably from 5 to 50% by weight, more preferably from 5 to 30% by weight and still more preferably from 5 to 20% by weight in view of uniformly aggregating the particles.

The pH value of the reaction system used in the aggregating step is preferably from 2 to 10, more preferably from 2 to 9 and still more preferably from 3 to 8 from the viewpoint of achieving both of a good dispersion stability of the mixed solution and a good aggregating property of the resin particles.

From the same viewpoint as described above, the temperature of the reaction system in the aggregating step is preferably not lower than the temperature calculated from "softening point of the resin binder−(minus) 60° C." (this means the temperature lower by 60° C. than the softening point of the resin binder; hereinafter defined in the same way) and not higher than the softening point of the resin binder. In the present invention, since the crystalline polyester and the non-crystalline resin are used in combination as the resin binder, the softening point of the resin binder is defined as a weighted mean value of softening points of the crystalline polyester and the non-crystalline resin (when using two or more kinds of non-crystalline resins, the softening point of the resin binder is determined from a weighted mean value of softening points of the resins including these non-crystalline resins; hereinafter defined in the same way). In addition, when using a master batch, the softening point of the resin binder in the form of a mixed resin is also determined from a weighted mean value of softening points of the resins including resins contained in the master batch.

In addition, the additives such as a colorant and a charge controlling agent may be previously mixed in the crystalline polyester or the non-crystalline resin upon preparing the respective resin particles. Alternatively, the respective additives may be separately dispersed in a dispersing medium such as water to prepare respective dispersions, and the thus prepared dispersions may be mixed with the resin particles and subjected to the aggregating step. When the additives are previously mixed in the crystalline polyester or the non-crystalline resin upon preparing the respective resin particles, the crystalline polyester or the non-crystalline resin and the additives are preferably previously melt-kneaded with each other.

The melt-kneading is preferably carried out using an open roll type twin-screw kneader. The open roll type twin-screw kneader has two rolls arranged close to and parallel with each other through which a heating medium can be passed to impart a heating function or a cooling function thereto. Thus, since the open roll type twin-screw kneader has a melt-kneading section having an open structure and is equipped with a heating roll and a cooling roll, a kneading heat generated upon the melt-kneading can be readily released therefrom unlike the conventional twin-screw kneaders.

In the aggregating step, in order to effectively carry out the aggregation, an aggregating agent may be added. As the organic aggregating agent, a cationic surfactant in the form of a quaternary salt, polyethyleneimine, or the like may be used, and as the inorganic aggregating agent, an inorganic metal salt, an inorganic ammonium salt, a divalent or higher-valent metal complex or the like may be used.

The inorganic metal salt includes, for example, metal salts such as sodium sulfate, sodium chloride, calcium chloride, calcium nitrate, barium chloride, magnesium chloride, zinc chloride, aluminum chloride and aluminum sulfate; and inorganic metal salt polymers such as poly(aluminum chloride), poly(aluminum hydroxide), and poly(calcium sulfide). Specific examples of the inorganic ammonium salts include ammonium sulfate, ammonium chloride and ammonium nitrate.

The amount of the aggregating agent added is preferably 60 parts by weight or less, more preferably 55 parts by weight or less and still more preferably 50 parts by weight or less on the basis of 100 parts by weight of the resin binder, in view of a good environmental resistance of the resulting toner.

The aggregating agent is preferably added in the form of an aqueous solution prepared by dissolving the aggregating agent in an aqueous medium, and the resulting mixture is preferably sufficiently stirred during and after addition of the aggregating agent.

In the step 3, the mixture containing the aqueous dispersion containing the crystalline polyester and the aqueous dispersion containing the non-crystalline resin, if required, together with various additives is preferably subjected to dispersing treatment at a temperature lower than the softening point of the resin binder and more preferably at a temperature not higher than the "softening point of the resin binder−(minus) 30° C." from the viewpoint of obtaining a uniform dispersion. More specifically, the temperature used upon the dispersing treatment is preferably 65° C. or lower and more preferably 55° C. or lower. Also, the dispersing treatment is preferably carried out at a temperature of 0° C. or higher and more preferably 10° C. or higher from the viewpoints of maintaining a good fluidity of the medium and saving an energy required for production of the aqueous dispersion of the respective resins.

From these viewpoints, the respective components can be dispersed by an ordinary method such as dispersing treatment by stirring at a temperature of preferably from about 0 to about 65° C. and more preferably from about 10 to about 55° C., thereby enabling preparation of a uniform resin dispersion.

The dispersing treatment may be carried out using a high-speed mixer or stirrer such as "Ultra Disper" (tradename: available from Asada Iron Works Co., Ltd.), "Ebara Milder" (tradename: available from Ebara Corporation) and "TK Homomixer" (tradename: available from PRIMIX Corporation); a homo-valve-type high-pressure homogenizer such as typically "High-Pressure Homogenizer" (tradename: available from Izumi Food Machinery Co., Ltd.) and "Mini-Lab 8.3H Model" (tradename: available from Rannie Corp.); and a chamber-type high-pressure homogenizer such as "Micro Fluidizer" (tradename: available from Microfluidics Inc.) and "Nanomizer" (tradename: available from NANOMIZER Inc.).

The volume median particle size of the aggregated particles obtained in the step 3 is preferably from 1 to 10 μm, more preferably from 2 to 8 μm and still more preferably from 3 to 7 μm from the viewpoint of uniformly coalescing the aggregated particles in the subsequent step 4 to produce toner particles.

[Step 4]

In the step 4, the aqueous dispersion of the aggregated particles prepared in the step 3 is subjected to a coalescing step, if required, after adding an aggregation stopping agent thereto, to coalesce the aggregated particles in the aqueous dispersion, thereby obtaining the resin binder.

In the step 4, the aggregated particles obtained in the step 3 are heated to obtain coalesced particles thereof.

The temperature of the reaction system in the step 4 is preferably not lower than the "softening point of the resin binder–(minus) 30° C." and not higher than the "softening point of the resin binder+(plus) 10° C."; more preferably not lower than the "softening point of the resin binder–(minus) 25° C." and not higher than the "softening point of the resin binder+(plus) 10° C."; and still more preferably not lower than the "softening point of the resin binder–(minus) 20° C." and not higher than the "softening point of the resin binder+(plus) 10° C.", from the viewpoints of well controlling a particle size, a particle size distribution and a shape of the toner as aimed, and attaining a good fusibility of the aggregated particles. In addition, the stirring rate used in the step 4 is preferably a rate at which the aggregated particles are not precipitated. More specifically, the temperature of the reaction system in the step 4 is preferably from 70 to 100° C. and more preferably from 70 to 90° C.

Meanwhile, if the aggregation stopping agent is added in the above step, a surfactant is preferably used as the aggregation stopping agent. The aggregation stopping agent is more preferably an anionic surfactant. Among the anionic surfactants, at least one compound selected from the group consisting of alkyl ether sulfates, alkyl sulfates and straight-chain alkylbenzenesulfonates is still more preferably used.

In the present invention, the toner for electrophotography may also contain the resin binder in the form of "core/shell particles" in which a core portion of the respective particles is constituted from the above crystalline polyester and the above non-crystalline resin, whereas a shell portion of the respective particles is constituted from the non-crystalline resin. The core portion of the respective core/shell particles is preferably composed of such a resin obtained by subjecting the aqueous dispersion containing the crystalline resin and the aqueous dispersion containing the non-crystalline resin to an aggregating step as described in the above step 3.

The toner for electrophotography which contains the core/shell particles may be obtained by providing, prior to the step 4, the step of mixing the aqueous dispersion of the aggregated particles prepared in the step 3 with the aqueous dispersion containing the non-crystalline resin to aggregate the aggregated particles with the non-crystalline resin.

The toner for electrophotography according to the present invention may be produced by appropriately subjecting the coalesced particles obtained in the step 4 to a liquid-solid separation step such as filtration, a washing step and a drying step.

In the washing step, the coalesced particles are preferably washed with an acid to remove metal ions from the surface of the respective toner particles for the purpose of ensuring sufficient charging characteristics and a good reliability required for the resulting toner. In the washing step, the coalesced particles are preferably washed to such an extent that the nonionic surfactant added is also completely removed therefrom. In addition, the coalesced particles are preferably washed with an aqueous solution at a temperature not higher than a cloud point of the nonionic surfactant. The washing procedure is preferably repeated a plurality of times.

In addition, in the drying step, any optional methods such as vibration-type fluidization drying method, spray-drying method, freeze-drying method and flash jet method may be employed. The content of water in the toner obtained after drying is preferably adjusted to 1.5% by weight or less and more preferably 1.0% by weight or less from the viewpoint of a good charging property of the resulting toner.

The thus obtained toner has a low fusibility when treated with an external additive. Therefore, an auxiliary agent such as a fluidizing agent can be readily added as the external additive to the surface of respective toner particles. As the external additive, there may be used known fine particles. Examples of the fine particles as the external additive include inorganic fine particles such as fine silica particles whose surface is subjected to a hydrophobic treatment, fine titanium oxide particles, fine alumina particles, fine cerium oxide particles and carbon blacks; and fine polymer particles such as fine particles of polycarbonates, polymethyl methacrylate, silicone resins, and the like.

The number-average particle size of the external additive is preferably from 4 to 200 nm and more preferably from 8 to 30 nm. The number-average particle size of the external additive may be determined using a scanning electron microscope or a transmission electron microscope.

The amount of the external additive added to the toner is preferably from 0.8 to 5 parts by weight, more preferably from 1 to 5 parts by weight and still more preferably from 1.5 to 3.5 parts by weight on the basis of 100 parts by weight of the toner before being treated with the external additive. However, when a hydrophobic silica is used as the external additive, the hydrophobic silica is added in an amount of from 0.8 to 3.5 parts by weight and preferably from 1 to 3 parts by weight on the basis of 100 parts by weight of the toner before being treated with the external additive to attain the above desired effects.

[Properties of Toner for Electrophotography]

The volume median particle size of the toner for electrophotography according to the present invention is preferably from 1 to 10 μm, more preferably from 2 to 8 μm and still more preferably from 3 to 7 μm from the viewpoints of a high image quality and a high productivity of the toner.

The toner for electrophotography obtained according to the present invention may be used in the form of a one-component system developer or a tow-component system developer formed by mixing the toner with a carrier.

The toner for electrophotography which contains the resin binder for toners according to the present invention is excellent in low-temperature fusing property, pressure storage stability and environmental stability.

EXAMPLES

Production Examples 1 to 9 and Comparative Production

Examples 1 to 7

(Production of Crystalline Polyester)

Crystalline polyesters A-1 to A-9 and B-1 to B-7 were respectively produced using the composition of raw materials and reaction conditions as shown in Table 1. The properties of the thus obtained crystalline polyesters as well as the properties of MEK soluble components of the respective crystalline polyesters are shown in Table 1. Meanwhile, the methods of measuring the respective properties and the reaction conditions are as follows.

[Method of Measuring Properties of Resin]

The softening point, melting point, number-average molecular weight, weight-average molecular weight, acid value and hydroxyl value of each of the crystalline polyester resins A-1 to A-9 and B-1 to B7 obtained in the Production Examples 1 to 9 and Comparative Production Examples 1 to 7, respectively, as shown in Table 1, were calculated by the following methods.

<Softening Point of Resin>

Using a flow tester "CFT-500D" available from Shimadzu Corporation, 1 g of a sample was extruded through a nozzle having a die pore size of 1 mm and a length of 1 mm while heating the sample at a temperature rise rate of 6° C./min and applying a load of 1.96 MPa thereto with a plunger of the flow tester. The softening point of the sample was determined as a temperature at which a half amount of the sample was flowed out when plotting a downward movement of the plunger of the flow tester relative to temperature.

<Endothermic Maximum Peak Temperature and Melting Point of Resin>

Using a differential scanning calorimeter (DSC; tradename: "Q-100" available from TA Instruments Japan Inc.), a sample was cooled from room temperature (20° C.) to 0° C. at a temperature drop rate of 10° C./min, allowed to stand as such at 0° C. for 1 min, and then heated up to 180° C. at a temperature rise rate of 10° C./min to measure an endothermic curve thereof. The temperature of the peak present on the highest temperature side among the endothermic peaks observed in the curve was determined as the endothermic maximum peak temperature (endothermic maximum peak temperature at 1st RUN). If the difference between the maximum peak temperature and the softening point was within 20° C., the sample was regarded as a crystalline polyester, and the maximum peak temperature was determined as a melting point of the crystalline polyester.

<Number-Average Molecular Weight and Weight-Average Molecular Weight of Resin>

The number-average molecular weight (Mn) and the weight-average molecular weight (Mw) of the resin were calculated from the molecular weight distribution measured by gel permeation chromatography (GPC) according to the following method.

(1) Preparation of Sample Solution

The resin was dissolved in chloroform to prepare a solution having a concentration of 0.5 g/100 mL. The resultant solution was then filtered through a fluororesin filter (tradename: "FP-200" commercially available from Sumitomo Electric Industries, Ltd.) having a pore size of 2 μM to remove insoluble components therefrom, thereby preparing a sample solution.

(2) Measurement of Molecular Weight Distribution

Using the below-mentioned apparatus, chloroform as an eluent was allowed to flow through a column at a flow rate of 1 mL/min, and the column was stabilized in a thermostat at 40° C. One hundred microliters of the sample solution was injected into the column to determine a molecular weight distribution of the sample. The molecular weight of the sample was calculated on the basis of a calibration curve previously prepared. The calibration curve of the molecular weight was prepared by using several kinds of monodisperse polystyrenes (those polystyrenes having number-average molecular weights of $2.63 \times 10^3$, $2.06 \times 10^4$ and $1.02 \times 10^5$ available from TOSOH CORPORATION; and those polystyrenes having number-average molecular weights of $2.10 \times 10^3$, $7.00 \times 10^3$ and $5.04 \times 10^4$ available from GL Sciences Inc.) as standard samples.

Analyzer: CO-8010 (tradename: commercially available from TOSOH CORPORATION)

Column: $GMH_{XL}$+$G3000H_{XL}$ (tradenames both commercially available from TOSOH CORPORATION)

<Acid Value and Hydroxyl Value of Resin>

The acid value of the resin was determined by the method according to JIS K 0070. However, only with respect to the solvent for the measurement, the mixed solvent of ethanol and ether as prescribed in JIS K 0070 was replaced with a mixed solvent containing acetone and toluene at a volume ratio of 1:1.

The hydroxyl value of the resin was measured according to JIS K 1557 under the following conditions.

Amount of sample: 2 g

Acetylating reagent: 10 mL, of a mixed solution containing 65 mL of acetic anhydride and 935 mL of pyridine Catalyst: None Reaction temperature: 99° C.

Reaction time: 2 h

Solvent: A mixed solvent containing acetone and toluene at a volume ratio of 1:1

Titrant: 0.5 mol/L KOH ethanol solution

[Method of Measuring Properties of MEK Soluble Component]

The endothermic peaks of MEK soluble components of the crystalline polyester resins A-1 to A-9 and B-1 to B-7 obtained in Production Examples 1 to 9 and Comparative Production Examples 1 to 7, respectively, as well as the amounts of soluble components, were calculated as follows. Meanwhile, the acid value and the hydroxyl value of the respective MEK soluble components were calculated by the same method as used for the crystalline polyester resin.

<Endothermic Peak Top Temperature of MEK Soluble Component and Endothermic Peak of MEK Soluble Component in the range of 10 to 40° C.>

Using a differential scanning calorimeter (DSC; "Q-100" available from TA Instruments Japan Inc.), a sample was cooled from room temperature (20° C.) to 0° C. at a temperature drop rate of 10° C./min, allowed to stand as such at 0° C. for 1 min, and then heated up to 180° C. at a temperature rise rate of 10° C./min to measure an endothermic curve thereof. The temperature of the peak present on the highest temperature side among the endothermic peaks observed in the curve was determined as an endothermic peak top temperature of the sample.

<Amount of Soluble Component>

The respective crystalline polyester resins obtained by the below-mentioned production methods A to F were took from a four-necked flask, and crushed by small mill (tradename: "SF-1" available from Sanriki Seisakusho Co., Ltd.) equipped with a 6 mm opening screen. The crushed products were screened by a screen made of stainless for JIS test (JIS-Z8801, 20 mesh, 800 μm opening) to remove finely-crushed resins.

The respective crystalline polyester resins removed the finely-crushed resins were added to MEK (methyl ethyl ketone) at 20° C. which was filled in a 5-L four-necked flask such that the amount of each crystalline polyester resin added was 200 g per 2 kg of MEK. Then, the contents of the flask were stirred at 20° C. for 1 hour using an agitation blade (anchor paddle-shaped double blade: diameter: 10 cm; height: 8 cm; width: 1.5 cm; thickness: 2 mm) at a rotating speed of 200 rpm. Thereafter, the resulting mixture was filtered through a 150-mesh wire screen (available from Hosokawa Kanaami Corporation) under normal pressures, and the obtained insoluble component was further mixed with 1 kg of MEK, followed by subjecting the resulting mixture to stirring and filtration two times under the above conditions. The resulting insoluble component was dried under reduced pressure (50° C.; 8 hours; 8 kPa) to obtain an MEK insoluble component of the crystalline polyester and measure a weight W (g) of the insoluble component. The amount (% by weight) of the soluble component was calculated from the following formula (1).

$$\text{Amount of Soluble Component(\% by weight)} = ((200-W)/200) \times 100 \qquad (1)$$

[Method for Synthesis of Crystalline Polyester (Step 1)]

The crystalline polyesters A-1 to A-9 and B-1 to B-7 obtained in Production Examples 1 to 9 and Comparative Production Examples 1 to 7, respectively, as shown in Table 1, were produced by any of the following production methods A to F.

<Production Method A>

The raw monomers of the polycondensation-based resin component with the formulation as shown in Table 1 were charged into a 10-L four-necked flask equipped with a nitrogen inlet tube, a dehydration tube, a stirrer and a thermocouple. The contents of the flask were heated to 140° C. and reacted at that temperature for 6 hours (reaction rate: 65%), and further reacted while heating them to 200° C. at a temperature rise rate of 10° C./h. After conducting the reaction at 200° C. until the reaction rate reached 80%, 20 g of tin 2-ethylhexanoate were added to the resulting reaction solution, and further the reaction was conducted at 200° C. for 2 hours. The obtained reaction mixture was further reacted for about 2 hours under a pressure of 8 kPa, thereby obtaining a crystalline polyester resin as shown in Table 1.

<Production Method B>

The raw monomers of the polycondensation-based resin component with the formulation as shown in Table 1 and 20 g of tin 2-ethylhexanoate were charged into a 10-L four-necked flask equipped with a nitrogen inlet tube, a dehydration tube, a stirrer and a thermocouple. The contents of the flask were heated to 140° C. and reacted at that temperature for 6 hours (reaction rate: 65%), and further reacted while heating them to 200° C. at a temperature rise rate of 10° C./h. After conducting the reaction at 200° C. until the reaction rate reached 80%, 10 g of tin 2-ethylhexanoate were added to the resulting reaction solution, and further the reaction was conducted at 200° C. for 2 hours. The obtained reaction mixture was further reacted for about 2 hours under a pressure of 8 kPa, thereby obtaining a crystalline polyester resin as shown in Table 1.

<Production Method C>

The raw monomers of the polycondensation-based resin component with the formulation as shown in Table 1 and 40 g of tin 2-ethylhexanoate were charged into a 10-L four-necked flask equipped with a nitrogen inlet tube, a dehydration tube, a stirrer and a thermocouple. The contents of the flask were heated to 140° C. and reacted at that temperature for 6 hours (reaction rate: 70%), and further reacted while heating them to 200° C. at a temperature rise rate of 10° C./h. After conducting the reaction at 200° C. until the reaction rate reached 90%, the obtained reaction mixture was further reacted for about 2 hours under a pressure of 8 kPa, thereby obtaining a crystalline polyester resin as shown in Table 1.

<Production Method D>

The raw monomers of the polycondensation-based resin component with the formulation as shown in Table 1 and 40 g of tin 2-ethylhexanoate were charged into a 10-L four-necked flask equipped with a nitrogen inlet tube, a dehydration tube, a stirrer and a thermocouple. The contents of the flask were reacted while heating them to 200° C. over 4 hours. After conducting the reaction at 200° C. until the reaction rate reached 90%, the obtained reaction mixture was further reacted for about 1 hour under a pressure of 8 kPa, thereby obtaining a crystalline polyester resin as shown in Table 1.

<Production Method E>

The raw monomers of the polycondensation-based resin component with the formulation as shown in Table 1 and 40 g of tin 2-ethylhexanoate were charged into a 10-L four-necked flask equipped with a nitrogen inlet tube, a dehydration tube, a stirrer and a thermocouple. The contents of the flask were heated to 180° C. and reacted at that temperature for 6 hours (reaction rate: 75%), and further reacted while heating them to 200° C. at a temperature rise rate of 10° C./h. After conducting the reaction at 200° C. until the reaction rate reached 90%, the obtained reaction mixture was further reacted for about 2 hours under a pressure of 8 kPa, thereby obtaining a crystalline polyester resin as shown in Table 1.

<Production Method F>

The raw monomers of the polycondensation-based resin component with the formulation as shown in Table 1 were charged into a 10-L four-necked flask equipped with a nitrogen inlet tube, a dehydration tube, a stirrer and a thermocouple. The contents of the flask were heated to 140° C. and reacted at that temperature for 6 hours, and further reacted while heating them to 200° C. at a temperature rise rate of 10° C./h. After conducting the reaction at 200° C. until the reaction rate reached 80%, 40 g of tin 2-ethylhexanoate were added to the resulting reaction solution, and further the reaction was conducted at 200° C. for 2 hours. The obtained reaction mixture was further reacted for 2 hours under a pressure of 8 kPa, thereby obtaining a crystalline polyester resin. The thus obtained crystalline polyester resin was mixed with methyl ethyl ketone in such an amount that the amount of methyl ethyl ketone added was 2 kg per 200 g of the crystalline polyester resin. Then, the resulting mixture was stirred at 20° C. for 1 hour under the same conditions as used above for measuring an amount of the soluble component, and filtered through a 150-mesh wire screen under normal pressures to separate an insoluble component therefrom. The thus separated insoluble component was further mixed with 1 kg of methyl ethyl ketone, and the resulting mixture was filtered. The stirring and filtration procedure was repeated two times, and the obtained insoluble component was dried to obtain a resin.

TABLE 1

|  |  |  | Production Examples | | | | | | | | |
|---|---|---|---|---|---|---|---|---|---|---|---|
|  |  |  | 1 | 2 | 3 | 4 | 5 | 6 | 7 | 8 | 9 |
| Crystalline polyester |  |  | A-1 | A-2 | A-3 | A-4 | A-5 | A-6 | A-7 | A-8 | A-9 |
| Raw materials | Alcohol component[*1] | 1,6-Hexanediol | 95 (2803) | 95 (2803) | 95 (2803) | 95 (2803) | 95 (2803) | 95 (2803) |  |  | 95 (2803) |
|  |  | 1,5-Pentanediol | 5 (130) | 5 (130) | 5 (130) | 5 (130) | 5 (130) | 5 (130) | 5 (130) | 5 (104) | 5 (130) |
|  |  | 1,9-Nonanediol |  |  |  |  |  |  | 95 (3800) |  |  |
|  |  | 1,12-Dodecanediol |  |  |  |  |  |  |  | 95 (3838) |  |
|  | Carboxylic acid component[*1] | Sebacic acid | 107 (5412) | 107 (5412) | 107 (5412) | 104 (5260) | 113 (5715) | 118 (5968) | 107 (5412) | 107 (4329) |  |
|  |  | Decanedicarboxylic acid |  |  |  |  |  |  |  |  | 107 (6161) |
|  |  | Succinic acid |  |  |  |  |  |  |  |  |  |

TABLE 1-continued

|  |  | | | | | | | | | |
|---|---|---|---|---|---|---|---|---|---|---|
| | Carboxylic acid component/ alcohol component (molar ratio) | 1.07 | 1.07 | 1.07 | 1.04 | 1.13 | 1.18 | 1.07 | 1.07 | 1.07 |
| Production conditions | Production method | A | B | C | C | C | C | C | C | C |
| | Retention time in temperature range of 130 to 160° C. | 140° C./6 h | 140° C./6 h | 140° C./6 h | 140° C./6 h | 140° C./6 h | 140° C./6 h | 140° C./6 h | 140° C./6 h | 140° C./6 h |
| | Method for addition of catalyst | *a | *b | *c | *c | *c | *c | *c | *c | *c |

|  |  | Production Examples | | | | | | | | |
|---|---|---|---|---|---|---|---|---|---|---|
| | | 1 | 2 | 3 | 4 | 5 | 6 | 7 | 8 | 9 |
| Crystalline polyester Properties | | A-1 | A-2 | A-3 | A-4 | A-5 | A-6 | A-7 | A-8 | A-9 |
| | Softening point (° C.) | 63.7 | 63.8 | 63.7 | 63.5 | 64.3 | 64.6 | 69.5 | 84.9 | 79.2 |
| | Melting point (° C.) as measured by DSC | 65.3 | 65.4 | 65.2 | 65.1 | 65.8 | 66 | 70.6 | 86.4 | 80.1 |
| | Number-average molecular weight | 4200 | 4100 | 4300 | 4300 | 3600 | 3200 | 4300 | 4200 | 4100 |
| | Weight-average molecular weight | 15800 | 16000 | 16100 | 14300 | 14300 | 10700 | 15400 | 15200 | 15000 |
| | Acid value (mgKOH/g) | 23.2 | 23.6 | 22.6 | 19.3 | 28.1 | 32.3 | 24.1 | 23.6 | 23.6 |
| | Hydroxyl value (mgKOH/g) | 9.7 | 9.9 | 9.1 | 14.2 | 4.8 | 4.1 | 9.5 | 8.9 | 8.7 |
| MEK soluble component | Endothermic peak top temperature (° C.) | 60.2 | 57.3 | 55.1 | 53.2 | 59.8 | 63.8 | 61.2 | 76.7 | 69.3 |
| | Temperature difference ["melting point of the crystalline polyester" − "endothermic peak top temperature"] (° C.) | 5.1 | 8.1 | 10.1 | 11.9 | 6.0 | 2.2 | 9.4 | 9.7 | 10.8 |
| | Presence or non-presence of endothermic peak in range of 10 to 40° C. | None | None | None | None | None | None | None | None | None |
| | Amount of soluble component (wt %) | 2.1 | 2.7 | 3.4 | 3.5 | 5.6 | 6.7 | 3.6 | 3.5 | 3.1 |
| | Acid value (mgKOH/g) | 78.3 | 75.6 | 70.6 | 57.3 | 92.5 | 97.6 | 74.4 | 79.3 | 72.5 |
| | Hydroxyl value (mgKOH/g) | 16.5 | 19.8 | 22.4 | 35.6 | 23.1 | 36.4 | 23.2 | 22.5 | 20.7 |

|  |  |  | Comparative Production Examples | | | | | | |
|---|---|---|---|---|---|---|---|---|---|
| | | | 1 | 2 | 3 | 4 | 5 | 6 | 7 |
| Crystalline polyester | | | B-1 | B-2 | B-3 | B-4 | B-5 | B-6 | B-7 |
| Raw materials | Alcohol component[*1] | 1,6-Hexanediol | 95 (2803) | 95 (2803) | 95 (2803) | 95 (2803) | | | 95 (3924) |
| | | 1,5-Pentanediol | 5 (130) | 5 (130) | 5 (130) | 5 (130) | 5 (130) | 5 (120) | 5 (182) |
| | | 1,9-Nonanediol | | | | | 95 (3800) | | |
| | | 1,12-Dodecanediol | | | | | | 95 (4414) | |
| | Carboxylic acid component[*1] | Sebacic acid | 107 (5412) | 107 (5412) | 107 (5412) | 100 (5058) | 100 (5058) | 100 (4653) | |
| | | Decanedicarboxylic acid | | | | | | | |
| | | Succinic acid | | | | | | | 107 (4419) |
| | Carboxylic acid component/alcohol component (molar ratio) | | 1.07 | 1.07 | 1.07 | 1.00 | 1.00 | 1.00 | 1.07 |
| Production conditions | Production method | | D | E | F | C | C | C | C |
| | Retention time in temperature range of 130 to 160° C. | | | 180° C./6 h | 140° C./6 h | 140° C./6 h | 140° C./6 h | 140° C./6 h | 140° C./6 h |
| | Method for addition of catalyst | | *c | *c | *a | *c | *c | *c | *c |

|  |  | Comparative Production Examples | | | | | | |
|---|---|---|---|---|---|---|---|---|
| | | 1 | 2 | 3 | 4 | 5 | 6 | 7 |
| Crystalline polyester Properties | | B-1 | B-2 | B-3 | B-4 | B-5 | B-6 | B-7 |
| | Softening point (° C.) | 63.9 | 63.3 | 64.5 | 63.4 | 69.1 | 84.6 | 102.4 |
| | Melting point (° C.) as measured by DSC | 65 | 65.4 | 66.1 | 64.9 | 70.3 | 86.0 | 106.3 |
| | Number-average molecular weight | 4000 | 4200 | 4600 | 4100 | 4400 | 4300 | 4300 |
| | Weight-average molecular weight | 15400 | 14900 | 15800 | 16400 | 15600 | 16100 | 15600 |
| | Acid value (mgKOH/g) | 24.3 | 25.4 | 22.6 | 16.4 | 17.2 | 16.4 | 24.3 |
| | Hydroxyl value (mgKOH/g) | 10.2 | 10.2 | 8.8 | 17.2 | 16.6 | 15.8 | 9.4 |

TABLE 1-continued

| MEK soluble component | Endothermic peak top temperature (° C.) | 49.6 | 50.3 | — | 47.6 | 52.6 | 66.9 | 94.7 |
|---|---|---|---|---|---|---|---|---|
| | Temperature difference ["melting point of the crystalline polyester" – "endothermic peak top temperature"] (° C.) | 15.4 | 15.1 | — | 17.3 | 17.7 | 19.1 | 11.6 |
| | Presence or non-presence of endothermic peak in range of 10 to 40° C. | Observed | Observed | — | Observed | Observed | Observed | None |
| | Amount of soluble component (wt %) | 4.1 | 3.9 | 0.0 | 3.4 | 3.3 | 3.4 | 3.6 |
| | Acid value (mgKOH/g) | 65.6 | 67.3 | — | 26.5 | 23.8 | 19.8 | 73.1 |
| | Hydroxyl value (mgKOH/g) | 28.9 | 27.2 | — | 69.4 | 71.2 | 68.8 | 21.3 |

Note
[*1] The numeral values each indicate an amount of raw monomer added (molar ratio based on a total amount of whole alcohol components as 100); the numeral value within each parenthesis indicates grams.
*a: upon reaching a reaction rate of 80%; *b: upon charging + upon reaching a reaction rate of 80%; *c: upon charging From Table 1, it is considered that since the melting point of the MEK soluble component of the crystalline polyester used in the present invention was lower than that of the crystalline polyester itself, the soluble component induces fusion of the crystalline polyester. In addition, it is considered that since the amount of the MEK soluble component was reduced, the amount of a soluble component due to a hydroxyl end group therein was also reduced.

On the other hand, the crystalline polyesters obtained in Comparative Production Examples 1, 2 and 4 to 6 had a large value of the temperature difference ["melting point of the crystalline polyester"–"endothermic peak top temperature"]. In Comparative Production Examples 1 and 2 in which the crystalline polyesters were obtained by the production methods D and E including no step of maintaining the temperature in the range of from 130 to 160° C., the value of the temperature difference ["melting point of the crystalline polyester"–"endothermic peak top temperature"] was large compared with Production Example 3. Meanwhile, in the production methods D and E, the reaction rate at 160° C. in the course of the temperature rise step was less than 40%.

Figure 2:
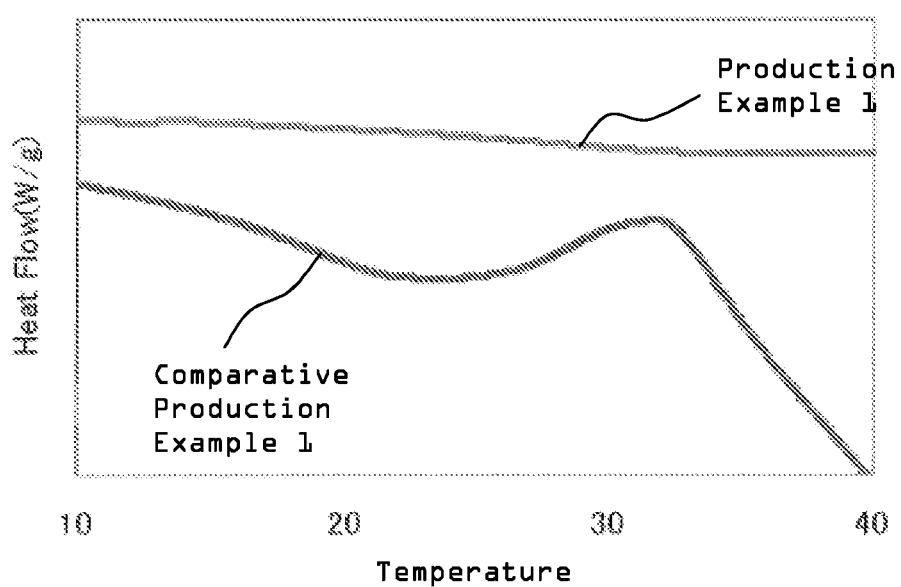
FIG. 2 is an enlarged view of a portion of FIG. 1 which lies in the range of from 10 to 40° C.

The endothermic peaks of the MEK soluble components (at 20° C.) of the crystalline polyesters A-1 and B-1 obtained in Production Example 1 and Comparative Production Example 1, respectively, as measured by a differential scanning calorimeter, are shown in FIGS. 1 and 2 in which FIG. 2 is an enlarged view of a portion of FIG. 1 in the range of 10 to 40° C. As apparently recognized from these figures, the endothermic peak of the MEK soluble component of the crystalline polyester B-1 obtained in Comparative Production Example 1 was observed in the temperature range of 10 to 40° C., whereas no endothermic peak was observed in the temperature range of 10 to 40° C. as to the MEK soluble component of the crystalline polyester A-1 obtained in Production Example 1.

As described in detail hereinlater, the toners produced from the crystalline polyesters obtained in Comparative Production Examples 1, 2 and 4 to 6 in which the value of the temperature difference ["melting point of the crystalline polyester"–"endothermic peak top temperature"] was large were deteriorated in pressure storage stability and environmental stability; the toner produced from the crystalline polyester obtained in Comparative Production Example 3 in which no MEK soluble component was present was deteriorated in low-temperature fusing property; and the toner produced from the crystalline polyester obtained in Comparative Production Example 7 in which the carboxylic acid component as the raw material contained no aliphatic dicarboxylic acid compound having 8 to 12 carbon atoms was deteriorated in pressure storage stability and environmental stability.

On the other hand, the toners produced from the crystalline polyesters obtained in Production Examples 1 to 9 all were excellent in pressure storage stability and environmental stability while maintaining an excellent low-temperature fusing property.

Examples 1 to 9 and Comparative Examples 1 to 7

(Production of Resin Binder for Toners and Production of Toner)

Using the crystalline polyesters A-1 to A-9 and B-1 to B-7 obtained in Production Examples 1 to 9 and Comparative Production Examples 1 to 7, respectively, the resin binders for toners and the toners were produced.

[Volume Median Particle Sizes ($D_{50}$) of Resin Particles, Colorant Fine Particles, Releasing Agent Fine Particles and Charge Controlling Agent Fine Particles]

Using a laser diffraction particle size analyzer "LA-920" (tradename) commercially available from HORIBA, Ltd., a cell for the measurement was filled with distilled water, and a volume median particle size ($D_{50}$) of the particles was measured at a concentration at which an absorbance thereof was within an adequate range.

[Method of Measuring Properties of Non-Crystalline Resin]

The glass transition temperature and number-average molecular weight of the respective non-crystalline resins as shown in Table 2 were calculated as follows. Meanwhile, the softening points and acid values of the non-crystalline resins were calculated by the same method as used for the crystalline polyester resins.

<Glass Transition Temperature of Non-Crystalline Resin>

Using a differential scanning calorimeter (tradename: "Q-100" available from TA Instruments Japan Inc.), a sample was weighed in an amount of 0.01 to 0.02 g on an aluminum pan, heated to 200° C., cooled from 200° C. to 0° C. at a temperature drop rate of 10° C./min, and further heated at a temperature rise rate of 10° C./min to prepare an endothermic curve thereof. The glass transition temperature of the sample was determined from the endothermic curve by reading out the temperature at which an extension of a base line below the endothermic maximum peak temperature intersects a tangential line having a maximum inclination in a region from a raise-up portion to an apex of the peak in the curve.

<Number-Average Molecular Weight of Non-Crystalline Resin>

The number-average molecular weight of the non-crystalline resin was measured by the same method as used for the crystalline polyester except for using tetrahydrofuran in place of chloroform as a solvent.

[Production of Non-Crystalline Resin AA]

The raw monomers with the formulation and amounts as shown in Table 2 except for trimellitic anhydride, and 5 g of tert-butyl catechol, were charged into a 10-L four-necked flask equipped with a nitrogen inlet tube, a dehydration tube, a stirrer and a thermocouple. The contents of the flask were rapidly heated to 180° C. and then gradually heated from 180° C. to 210° C. over 10 hours to react with each other. Further, the pressure was reduced to 8.3 kPa at which the reaction was conducted 210° C. for 1 hour. Thereafter, trimellitic anhydride was added to the resulting reaction solution at 210° C., and the reaction was further conducted at 210° C. under 8 kPa until reaching the softening point shown in Table 2 to produce a non-crystalline resin AA.

[Production of Non-Crystalline Resin AB]

The raw monomers with the formulation and amounts as shown in Table 2 except for trimellitic anhydride, 40 g of tin octylate and 2 g of gallic acid monohydrate, were charged into a 10-L four-necked flask equipped with a nitrogen inlet tube, a dehydration tube, a stirrer and a thermocouple. The contents of the flask were reacted at 230° C. for 8 hours. Further, the pressure was reduced to 8.3 kPa at which the reaction was conducted 230° C. for 1 hour. Then, trimellitic anhydride was added to the resulting reaction solution at 210° C., and the reaction was further conducted until reaching the softening point shown in Table 2 to produce a non-crystalline resin AB.

TABLE 2

| Raw monomers | Non-crystalline resin | | | |
|---|---|---|---|---|
| | AA | | AB | |
| | g | mol %*4 | g | mol %*4 |
| (Alcohol component) | | | | |
| BPA-PO*2 | 1400 | 20 | 2100 | 30 |
| BPA-EO*3 | 5200 | 80 | 4550 | 70 |
| (Carboxylic acid component) | | | | |
| Terephthalic acid | 2158 | 65 | 1992 | 60 |
| Dodecenyl succinic anhydride | 804 | 15 | 804 | 15 |
| Trimellitic anhydride | 384 | 10 | — | — |
| Properties | | | | |
| Softening point (° C.) | 124.3 | | 96.4 | |
| Acid value (mgKOH/g) | 26.3 | | 20.4 | |
| Glass transition temperature (° C.) | 61.2 | | 57.2 | |
| Number-average molecular weight | 3400 | | 2700 | |

Note
*2Polyoxypropylene (2.2) adduct of bisphenol A
*3Polyoxyethylene (2.0) adduct of bisphenol A
*4Molar ratio based on a total amount (moles) of whole alcohol components as 100.

[Preparation of Aqueous Dispersion of Crystalline Polyester (Step 2)]

A 5-L container equipped with a stirrer, a reflux condenser, a dropping funnel, a thermometer and a nitrogen inlet tube was charged with 600 g of methyl ethyl ketone and 200 g of the respective crystalline polyesters A-1 to A-9 or B-1 to B-7 to dissolve the respective crystalline polyesters in methyl ethyl ketone at 70° C.

The resulting solution was mixed with a 5% potassium hydroxide aqueous solution such that a neutralization degree of the solution was 95%. Successively, after adding 2500 g of ion-exchanged water to the obtained reaction solution, MEK was distilled off from the reaction solution at 70° C. under reduced pressure while stirring at rate of 250 r/min until the MEK content in the reaction solution reached 30 ppm or less. The solid content of the thus obtained aqueous dispersion of the self-dispersible crystalline polyester was measured, and then ion-exchanged water was added to the aqueous dispersion such that a solid content of the aqueous dispersion was adjusted to 10% by weight, thereby obtaining a dispersion of the respective crystalline polyesters. The volume median particle size of the respective crystalline polyesters was in the range of from 150 to 200 nm.

[Preparation of Aqueous Dispersion of Non-Crystalline Resin]

A 5-L container equipped with a stirrer, a reflux condenser, a dropping funnel, a thermometer and a nitrogen inlet tube was charged with 600 g of methyl ethyl ketone and 2 g of an anionic surfactant "Kao Akypo RLM-100" (tradename: available from Kao Corporation; component: polyoxyethylene lauryl ether acetate) and further with 100 g of the non-crystalline resin AA or AB at 50° C. to dissolve the non-crystalline resin in methyl ethyl ketone.

The resulting solution was mixed with potassium hydroxide such that a neutralization degree of the solution was 90%. Successively, after adding 2000 g of ion-exchanged water to the obtained reaction solution, MEK was distilled off from the reaction solution at a temperature not higher than 50° C. under reduced pressure while stirring at a rate of 250 r/min until the MEK content in the reaction solution reached 30 ppm or less. The solid content of the thus obtained aqueous dispersion of the self-dispersible non-crystalline resin was measured, and then ion-exchanged water was added to the aqueous dispersion such that a solid content of the aqueous dispersion was adjusted to 10% by weight, thereby respectively obtaining a dispersion of the non-crystalline resin AA and a dispersion of the non-crystalline resin AB. The volume median particle size of the respective non-crystalline resins was 150 nm.

<Preparation of Colorant Dispersion>

Fifty grams of copper phthalocyanine ("ECB-301" available from Dainichiseika Color & Chemicals Mfg. Co., Ltd.), 5 g of a nonionic surfactant ("EMULGEN (registered trademark) 150" available from Kao Corporation) and 200 g of ion-exchanged water were mixed with each other to dissolve the copper phthalocyanine. The resulting solution was dispersed for 10 min using a homogenizer, thereby obtaining a colorant dispersion containing colorant fine particles. The colorant fine particles contained in the thus obtained colorant dispersion had a volume median particle size of 120 nm.

<Preparation of Releasing Agent Dispersion>

Fifty grams of a paraffin wax ("HNP 9" (tradename) available from NIPPON SEIRO Co., Ltd.; melting point: 85° C.), 5 g of a cationic surfactant ("SANISOL (registered trademark) B50" available from Kao Corporation) and 200 g of ion-exchanged water were mixed and heated to 95° C., and then stirred using a homogenizer to disperse the paraffin wax therein. The resulting dispersion was subjected to dispersing treatment using a pressure injection type homogenizer, thereby obtaining a releasing agent dispersion containing releasing agent fine particles. The releasing agent fine particles contained in the thus obtained dispersion had a volume-median particle size of 550 nm <Preparation of Charge Controlling Agent Dispersion>

Fifty grams of a charge controlling agent ("BONTRON E-84" (tradename) available from Orient Chemical Industries Co., Ltd.), 5 g of a nonionic surfactant ("EMULGEN (registered trademark) 150" available from Kao Corporation) and 200 g of ion-exchanged water were mixed with each other. The resulting mixture was dispersed with glass beads using a sand grinder for 10 min to obtain a charge controlling agent dispersion containing charge controlling agent fine particles.

The charge controlling agent fine particles contained in the thus obtained dispersion had a volume-median particle size of 500 nm.

[Production of Aqueous Dispersion of Aggregated Particles (Step 3)]

A 2-L container was charged with 300 g of a resin dispersion prepared by mixing the respective dispersions in such a mixing ratio that the contents of the crystalline polyester and the non-crystalline resin therein were adjusted as shown in Table 3, 8 g of the colorant dispersion, 6 g of the releasing agent dispersion, 2 g of the charge controlling agent dispersion and 52 g of deionized water.

Next, while stirring the resulting mixture with a paddle-shaped stirrer at a rate of 100 r/min, 146 g of a 6.2 wt % ammonium sulfate aqueous solution were added dropwise thereto at room temperature over 30 min. Thereafter, the resulting reaction solution was heated while stirring and held at 50° C. at the time of reaching 50° C., and allowed to stand at that temperature for 3 hours to form aggregated particles. Then, a dilute solution prepared by diluting 4.2 g of an aqueous solution of sodium polyoxyethylene dodecyl ether sulfate (solid content: 28% by weight) as an aggregation stopping agent with 37 g of deionized water was added to the resulting reaction dispersion.

[Production of Aqueous dispersion of Coalesced Particles (Step 4) and Production of Toner]

Next, the thus obtained dispersion was heated to 80° C. at a temperature rise rate of 0.16° C./min and held at 80° C. for 1 hour after the temperature has reached 80° C., and then the heating was terminated, thereby forming coalesced particles and obtaining a resin binder. The dispersion containing the thus obtained coalesced particles was gradually cooled to room temperature, and then subjected to suction filtration treatment, washing treatment and drying treatment, thereby obtaining toners T-1 to T-8 and U-1 to U-7. The thus obtained toners were evaluated for a low-temperature fusing property, an environmental stability of a degree of chargeability, and a pressure storage stability by the following methods. The results are shown in Table 3.

Thereafter, 100 parts by weight of the toner mother particles were mixed and externally added with 2.0 parts by weight of a hydrophobic silica "NAX-50" (tradename: available from Nippon Aerosil Co., Ltd.; number-average particle size: 40 nm) and 1.5 parts by weight of a hydrophobic silica "R972" (tradename: available from Nippon Aerosil Co., Ltd.; number-average particle size: 16 nm) while stirring using a 10-L Henschel mixer (available from Nippon Coke & Engineering Co., Ltd.) equipped with an agitation blade of an ST (upper blade)-AO (lower blade) type at 3000 rpm for 2 min, thereby obtaining a toner.

<Evaluation of Low-Temperature Fusing Property>

The toner was loaded into a copying machine "AR-505" (tradenames) available from Sharp Corporation, to obtain an unfused image (printed area: 2 cm×12 cm; amount of the toner deposited: 0.5 mg/cm$^2$). With a fuser of the copying machine being set to Off-Line, the image was fused on a paper at a rate of 300 mm/sec while increasing the fusing temperature from 90° C. to 240° C. at intervals of 5° C. Meanwhile, "Copy Bond SF-70NA" (tradename: available from Sharp Corporation; 75 g/m$^2$) was used as the fusing paper.

The fused image obtained by passing the paper through the fuser was rubbed with a sand eraser having a bottom surface area of 15 mm×7.5 mm (Tradename: LION ER-502R INK & BALLPEN, available from LION Office Products Corporation) by reciprocating the eraser over the fused image by 5 strokes while applying a load of 500 g thereto. Then, optical reflection density values of the fused image before and after rubbing, were measured using a reflection-type densitometer "RD-915" (tradename) available from GretagMacbeth Corporation. From the thus measured values, a minimum fusing temperature of the toner was determined as the temperature of a fusing roll at which a ratio between the optical reflection density values of the fused image before and after rubbing (after rubbing/before rubbing) first exceeded 80%. The minimum fusing temperature thus determined was examined to evaluate a low-temperature fusing property of the toner according to the following evaluation criteria. The lower the minimum fusing temperature, the more excellent the low-temperature fusing property of the toner becomes.

5: Minimum fusing temperature was lower than 120° C.;
4: Minimum fusing temperature was not lower than 120° C. but lower than 125° C.;
3: Minimum fusing temperature was not lower than 125° C. but lower than 130° C.;
2: Minimum fusing temperature was not lower than 130° C. but lower than 135° C.; and
1: Minimum fusing temperature was not lower than 135° C.

<Evaluation of Pressure Storage Stability>

Ten grams of the toner were charged into a cylindrical container having a radius of 12 mm. Then, the toner thus filled in the container was loaded from above with a weight of 100 g, and allowed to stand under environmental conditions of a temperature of 50° C. and a relative humidity of 60% for 24 hours. Three sieves including a sieve A (mesh size: 250 μm), a sieve B (mesh size: 150 μm) and a sieve C (mesh size: 75 μm) were set to a powder tester (available from Hosokawa Micron Corporation) in an overlapped state in this order from above, and 10 g of the toner stored under pressure was placed on the uppermost sieve A and vibrated for 60 seconds. The weight WA (g) of the toner remaining on the sieve A, the weight WB (g) of the toner remaining on the sieve B and the weight WC (g) of the toner remaining on the sieve C were respectively measured. The toner was evaluated for fluidity pressure storage stability on the basis of the value ($\alpha$) calculated from the following formula, according to the following evaluation criteria. As the value ($\alpha$) is closer to 100, the pressure storage stability becomes more excellent.

$\alpha = 100 - (WA + WB \times 0.6 + WC \times 0.2)/10 \times 100$

5: $\alpha$=from 90 to 100;
4: $\alpha$=not less than 80 but less than 90;
3: $\alpha$=not less than 70 but less than 80;
2: $\alpha$=not less than 60 but less than 70; and
1: $\alpha$=less than 60.

<Evaluation of Environmental Stability>

The toner was loaded in a non-magnetic one component-type developing device "MicroLine 9300PS" (tradename) available from Oki Data Corporation. After images having a printing percentage of 5% were printed on 20 sheets under environmental conditions of a temperature of 25° C. and a humidity of 50%, the optical reflection density of the images on the 20th sheet was measured using a reflection-type densitometer "RD-915" (tradename) available from GretagMacbeth Corporation.

In addition, after the above device was allowed to stand under environmental conditions of a temperature of 25° C. and a humidity of 90% for 4 hours, images having a printing percentage of 5% were further printed on 20 sheets, and then the optical reflection density of the images on the 20th sheet was measured again using a reflection-type densitometer "RD-915" (tradename) available from GretagMacbeth Corporation. The difference between the thus measured image densities on both the sheets was calculated to evaluate an environmental stability of the toner according to the following evaluation criteria. The smaller the difference between the image densities, the more excellent the environmental stability of the toner becomes.

5: Difference between image densities was less than 0.1;
4: Difference between image densities was not less than 0.1 but less than 0.2;
3: Difference between image densities was not less than 0.2 but less than 0.3;
2: Difference between image densities was not less than 0.3 but less than 0.4; and
1: Difference between image densities was not less than 0.4.

TABLE 3

|  | Examples | | | | | | | | | Comparative Examples | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 | 6 | 7 |
| Toner | T-1 | T-2 | T-3 | T-4 | T-5 | T-6 | T-7 | T-8 | T-9 | U-1 | U-2 | U-3 | U-4 | U-5 | U-6 | U-7 |
| Crystalline polyester | A-1 | A-2 | A-3 | A-4 | A-5 | A-6 | A-7 | A-8 | A-9 | B-1 | B-2 | B-3 | B-4 | B-5 | B-6 | B-7 |
| Non-crystalline resin (AA/AB: weight ratio) | 4/5 | 4/5 | 4/5 | 4/5 | 4/5 | 4/5 | 4/5 | 4/5 | 4/5 | 4/5 | 4/5 | 4/5 | 4/5 | 4/5 | 4/5 | 4/5 |
| Crystalline polyester/non-crystalline resin (weight ratio) | 1/9 | 1/9 | 1/9 | 1/9 | 1/9 | 1/9 | 1/9 | 1/9 | 1/9 | 1/9 | 1/9 | 1/9 | 1/9 | 1/9 | 1/9 | 1/9 |
|  | Properties | | | | | | | | | | | | | | | |
| Low-temperature fusing property | 5 | 4 | 4 | 3 | 5 | 3 | 4 | 3 | 3 | 3 | 3 | 1 | 1 | 1 | 1 | 4 |
| Pressure storage stability | 5 | 5 | 4 | 4 | 3 | 2 | 4 | 4 | 4 | 1 | 1 | 5 | 1 | 1 | 1 | 1 |
| Environmental stability | 5 | 4 | 4 | 3 | 4 | 3 | 4 | 5 | 4 | 2 | 2 | 5 | 1 | 1 | 1 | 1 |

From Table 3, it was confirmed that the toners T-1 to T-9 obtained by the production methods according to the present invention were more excellent in low-temperature fusing property, pressure storage stability and environmental stability as compared to the toners U-1 to U-7 which contained no resin binder of the present invention.

INDUSTRIAL APPLICABILITY

The toner containing the resin binder obtained according to the present invention is excellent in low-temperature fusing property, pressure storage stability and environmental stability, and can be therefore suitably used as a toner for electrophotography which is employed in an electrophotographic method, an electrostatic recording method, an electrostatic printing method and the like.

The invention claimed is:

1. A process for producing a resin binder for toners which contains a crystalline polyester, comprising the step of polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol %,
wherein a molar ratio of the carboxylic acid component to the alcohol component (carboxylic acid component/alcohol component) is from 1.03 to 1.20, and
the process includes the step of conducting the polycondensation in a temperature range of from 130 to 160° C. until a reaction rate as calculated from an amount of a reaction water discharged from the reaction system reaches 40% or more assuming that the reaction rate upon discharge of a theoretical amount of the reaction water is 100%;
wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.

2. The process for producing a resin binder for toners according to claim 1, wherein an esterification catalyst is added to the reaction system when a polycondensation reaction rate as calculated from an amount of a reaction water discharged from the reaction system reaches 70% or more, assuming that the reaction rate upon discharge of a theoretical amount of the reaction water is 100%.

3. The process for producing a resin binder for toners according to claim 1, wherein the process includes the step of conducting the polycondensation under a reduced pressure of 12 kPa or less when the reaction rate of the polycondensation reaction reaches 90% or more, assuming that the reaction rate upon discharge of a theoretical amount of the reaction water is 100%.

4. A process for producing a toner, comprising the following steps 1 to 4:
Step 1: polycondensing at least an alcohol component containing an aliphatic diol having 2 to 12 carbon atoms and a carboxylic acid component containing an aliphatic dicarboxylic acid compound having 8 to 12 carbon atoms in an amount of from 70 to 100 mol % to obtain a crystalline polyester, wherein a content of a methyl ethyl ketone soluble component (at 20° C.) in the crystalline polyester is from 0.5 to 7% by weight on the basis of a weight of the crystalline polyester, and a difference between a melting point of the crystalline polyester and a peak top temperature observed in DSC measurement of the methyl ethyl ketone soluble component ("melting point of the crystalline polyester"–"peak top temperature observed in DSC measurement of the methyl ethyl ketone soluble component") is within the range of from 1 to 15° C.;
Step 2: preparing an aqueous dispersion containing the crystalline polyester obtained in the step 1;
Step 3: mixing the aqueous dispersion containing the crystalline polyester which is prepared in the step 2 with an aqueous dispersion containing a non-crystalline resin and then subjecting the resulting dispersion to an aggregating step to prepare an aqueous dispersion of aggregated particles; and Step 4: subjecting the aqueous dispersion of the aggregated particles prepared in the step 3 to a coalescing step to prepare an aqueous dispersion of coalesced particles.

5. The process for producing a toner according to claim 4, wherein a molar ratio of the carboxylic acid component to the alcohol component (carboxylic acid component/alcohol component) is from 1.03 to 1.20.

* * * * *